US012580735B1

(12) United States Patent

Schneider et al.

(10) Patent No.: US 12,580,735 B1
(45) Date of Patent: Mar. 17, 2026

(54) PROCESSOR AND SYSTEM TO VERIFY MEDIA AUTHENTICITY USING A DISTRIBUTED LEDGER

(71) Applicant: Nvidia Corporation, Santa Clara, CA (US)

(72) Inventors: Christopher Schneider, Hillend (GB); Andrew Woodard, High Wycombe (GB)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/445,687

(22) Filed: Jun. 19, 2019

(51) Int. Cl.
*H04L 9/06* (2006.01)
*H04L 9/32* (2006.01)
*H04L 9/00* (2022.01)

(52) U.S. Cl.
CPC .......... *H04L 9/0643* (2013.01); *H04L 9/3247* (2013.01); *H04L 9/50* (2022.05)

(58) Field of Classification Search
None
See application file for complete search history.

(56) References Cited

U.S. PATENT DOCUMENTS

2016/0330027 A1 * 11/2016 Ebrahimi ............. H04L 9/3066
2018/0121635 A1 * 5/2018 Tormasov ............. H04L 9/3297
2018/0218753 A1 * 8/2018 Hodge ............... H04N 21/2181
2020/0162236 A1 * 5/2020 Miller ................. G06F 16/2379
2020/0372184 A1 * 11/2020 Meirosu ................ H04L 9/3247

FOREIGN PATENT DOCUMENTS

EP 3389280 A1 * 10/2018 ........... H04L 9/3242
KR 20060101421 A * 9/2006 ....... G06F 17/30843

OTHER PUBLICATIONS

Billstrom et al., "Video Integrity through Blockchain Technology," KTH Royal Institute of Technology, Aug. 2, 2017, 96 pages (Year: 2017).*

Billstrom et al., "Video Integrity tthrough Blockchain Technology," KTH Royal Institute of Technology, Aug. 2, 2017, 96 pages (Year: 2017).*

Billström et al., "Video Integrity through Blockchain Technology," KTH Royal Institute of Technology, Aug. 2, 2017, 96 pages.

Gipp et al., "Securing Video Integrity Using Decentralized Trusted Timestamping on the Bitcoin Blockchain," Tenth Mediterranean Conference on Information Systems, Sep. 2016, 10 pages.

IEEE, "IEEE Standard 754-2008 (Revision of IEEE Standard 754-1985): IEEE Standard for Floating-Point Arithmetic," Aug. 29, 2008, 70 pages.

* cited by examiner

*Primary Examiner* — Jeffrey C Pwu
*Assistant Examiner* — Mayasa A. Shaawat
(74) *Attorney, Agent, or Firm* — S. Scott Foster; Kowert, Hood, Munyon, Rankin & Goetzel, P.C.

(57) ABSTRACT

Apparatuses, systems, and techniques to enable verification of content, such as media content. Hashes of content can be digitally signed and stored to a distributed ledger, such that a source of content can be verified and any modification determined.

21 Claims, 26 Drawing Sheets

400

450

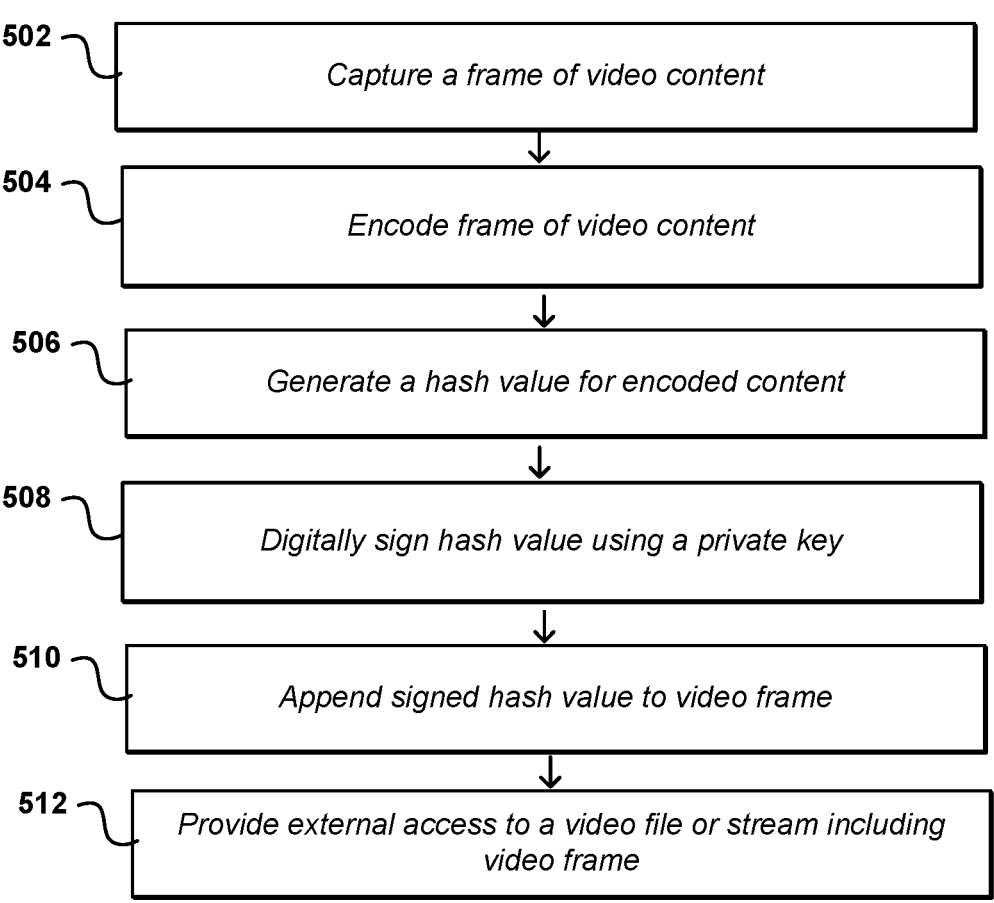
502 — Capture a frame of video content
504 — Encode frame of video content
506 — Generate a hash value for encoded content
508 — Digitally sign hash value using a private key
510 — Append signed hash value to video frame
512 — Provide external access to a video file or stream including video frame
FIG. 5

702 Receive media file or stream

704 Obtain publisher public key

706 Obtain access to distributed ledger

708 Decode hash value for a video frame using public key

710 Generate a hash value for video frame

712 Compare generated hash value against hash value that was appended to video frame 714 Match?

No → Indicate unverified 716

Yes ↓

718 Provide playback with notification of verification

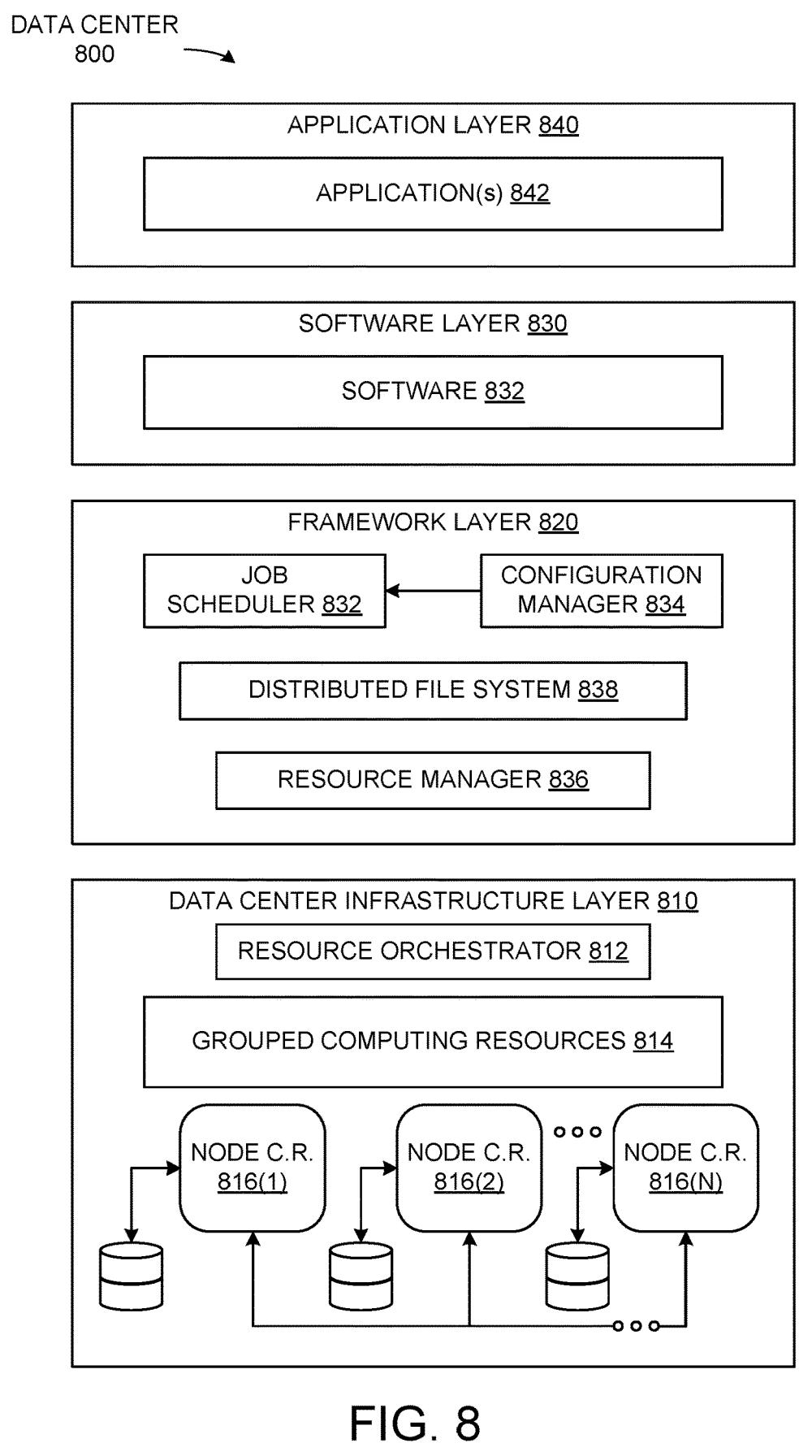

DATA CENTER
800

APPLICATION LAYER <u>840</u>

APPLICATION(s) <u>842</u>

SOFTWARE LAYER <u>830</u>

SOFTWARE <u>832</u>

FRAMEWORK LAYER <u>820</u>

JOB SCHEDULER <u>832</u>

CONFIGURATION MANAGER <u>834</u>

DISTRIBUTED FILE SYSTEM <u>838</u>

RESOURCE MANAGER <u>836</u>

DATA CENTER INFRASTRUCTURE LAYER <u>810</u>

RESOURCE ORCHESTRATOR <u>812</u>

GROUPED COMPUTING RESOURCES <u>814</u>

NODE C.R. <u>816(1)</u>

NODE C.R. <u>816(2)</u> o o o

NODE C.R. <u>816(N)</u> o o o

FIG. 8

SOC INTEGRATED
CIRCUIT
1300

APPLICATION
PROCESSOR(s)
1305

GRAPHICS
PROCESSOR
1310

IMAGE
PROCESSOR
1315

VIDEO
PROCESSOR
1320

USB
1325

UART
1330

SPI/SDIO
1335

I²S/I²C
1340

DISPLAY
1345

SECURITY
ENGINE
1370

MEMORY
1365

FLASH
1360

MIPI
1355

HDMI
1350

GRAPHICS PROCESSOR
1410

GRAPHICS PROCESSOR
1440

INTER-CORE TASK MANAGER
(e.g., THREAD DISPATCHER)
1445

SHADER CORE 1455A

SHADER CORE 1455C

SHADER CORE 1455E

- - -

SHADER CORE 1455N-1

SHADER CORE 1455B

SHADER CORE 1455D

SHADER CORE 1455F

- - -

SHADER CORE 1455N

TILING UNIT
1458

MMU
1420A

MMU
1420B

CACHE
1425A

CACHE
1425B

INTERCONNECT
1430A

INTERCONNECT
1430B

PROCESSOR AND SYSTEM TO VERIFY MEDIA AUTHENTICITY USING A DISTRIBUTED LEDGER

BACKGROUND

An ever-increasing amount of content is being generated and distributed digitally from a number of different sources. Unfortunately, there is also an ever-increasing variety of ways to modify this content in ways that may be difficult to discern. This includes not only editing out portions of the content that may remove at least some of the context for the content, but also the ability to manipulate the appearance or presentation of the content. It is thus becoming increasingly difficult to determine the origin, authenticity, and completeness of a segment of media data.

BRIEF DESCRIPTION OF THE DRAWINGS

At least one embodiment in accordance with the present disclosure will be described with reference to the drawings, in which:

FIG. 5 illustrates an example process for generating verifiable media content, in at least one embodiment;

FIG. 8 illustrates an example data center system, in at least one embodiment;

DETAILED DESCRIPTION

Figure 1:
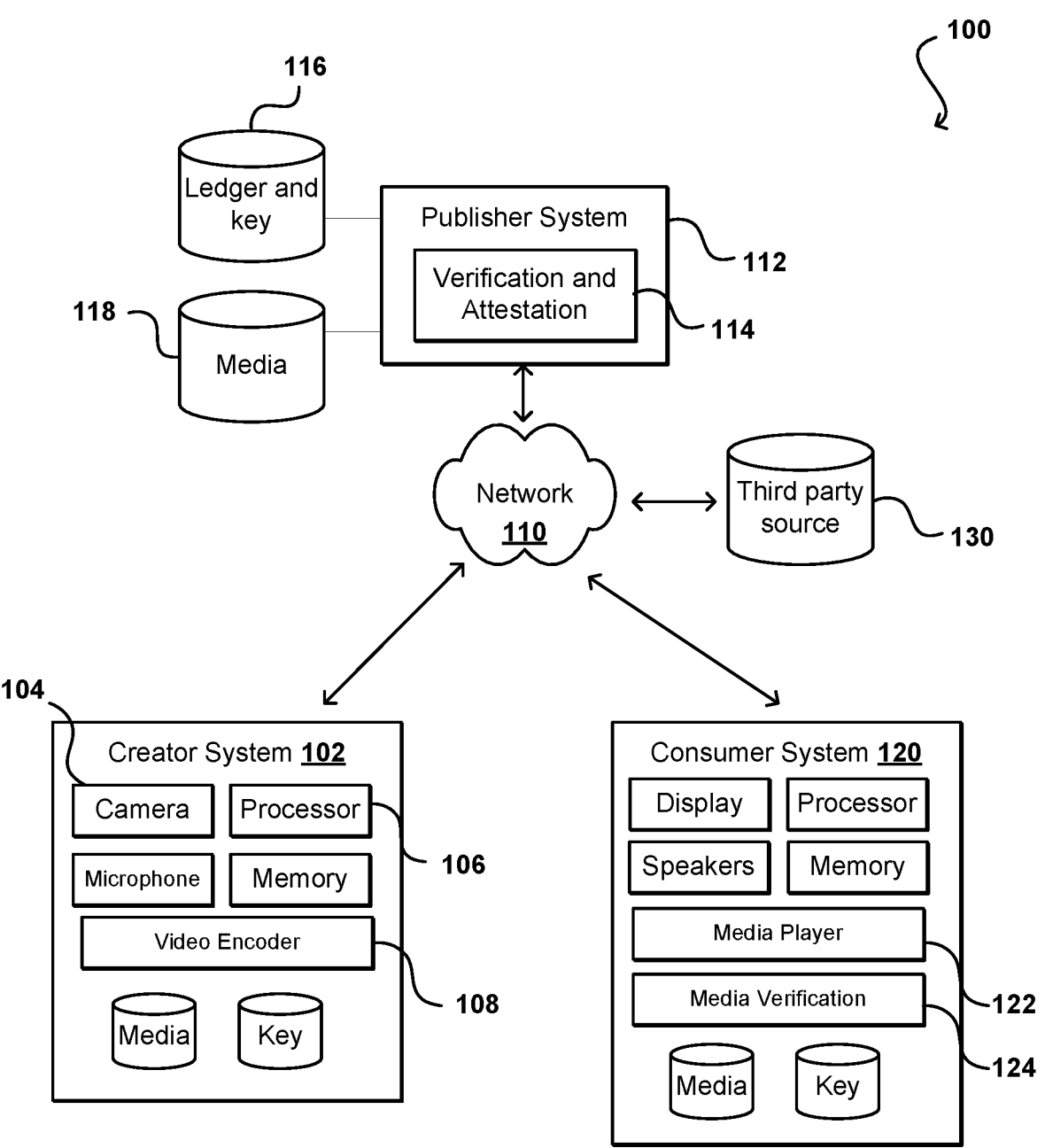
FIG. 1 illustrates components of an example environment, in at least one embodiment.

FIG. 1 illustrates an example environment 100 in which data, such as multimedia data, can be generated, distributed, and consumed, in at least one embodiment. In at least one embodiment, a creator system 102 can be used to capture or generate media content. In at least one embodiment at least one computing device including camera 104 and microphone capturing multimedia content that can be saved to a local storage device, such as a hard drive or flash memory for a computing device. In at least one embodiment content can also be streamed, transmitted, or otherwise provided for storage off a device. In at least one embodiment a user of creator system 120, referred to herein as a creator, can upload this media content to a publisher system 112, such as a system associated with a news organization. In at least one embodiment a publisher system can include various computing devices in at least one embodiment. In at least one embodiment, publisher system 112 can receive this media content and, after any internal review, editing, or other such processing, store this media to a media repository 118 and provide access to this media content to one or more consumers. It should be understood that consumers may refer to any person, system, or entity that consumes this content, as may include individual users, broadcasters, other publisher organizations, and so on.

In at least one embodiment, there are various entities that may obtain access to media content in order to modify this content in some way. In at least one embodiment this can include any person associated with a creator, publisher, or consumer, or can include a third party obtaining access to this content. In at least one embodiment, consumer system 120 might obtain a copy of this content from such a third party source 130, which may include another consumer or entity having obtained a copy of at least a portion of this media content. In at least one embodiment, a media file may represent only a portion of an overall media file, such as to cut off a beginning or end portion, which may impact a perceived content or context of a media file. In at least one embodiment there may also be frames or portions removed from within a media file that cause certain portions of this content to no longer be represented in this media file. In at least one embodiment, an entity might modify a visual or audible aspect of a media file, such as to modify an action taken, an identity of a person in this video, or something that is said by a person represented in this video. In at least one embodiment other modifications may be made as well, as may depend at least in part upon a type of data represented in a file, stream, or other grouping of content.

In at least one embodiment, mechanisms are provided for determining authenticity of a set of data, such as a file or stream of media content, as well as whether any modifications have been made to data. In at least one embodiment, an example system utilizes a video codec (or other program or mechanism for encoding a digital data) that incorporates a set of digitally-signed hashes, which can be stored to a distributed ledger such as a blockchain. In at least one embodiment this can help to guard against malicious tampering of falsification of data, such as video files or streams.

In at least one embodiment, such as may correspond to example environment 100 of FIG. 1, a creator system 102 can utilize a camera 104 to capture video data. In at least one embodiment, a video encoder 108, which can include hardware such as at least one graphics processor unit (GPU) and encoding software, can encode individual frames of video content. In at least one embodiment this can include capturing and compressing data for storage, where compression can include generating a set of keyframes that each contain a full representation of content of a respective video frame, as well as delta frames that include representations of changes in content relative to a prior frame in a sequence of frames. It should be understood that "frames" are just an example and any data representing a point in time or period, or other such segment or portion, can be used as well.

In at least one embodiment, video encoder 108 can be configured (in hardware and/or software) to generate hash values for individual frames of video. In at least one embodiment this can be performed for every frame in a sequence, or individual keyframes of a sequence. In at least one embodiment, a compressed block of data for a keyframe has a checksum performed as video is being encoded, although various other types of hashing algorithms can be used as well, as may include algorithms such as secure hashing algorithms (e.g., SHA-1 or SHA-2). In at least one embodiment creator system 102 can have a private key that is unique to creator system 102, such as may be related to a GPU or video encoder on this creator system. In at least one embodiment a key may be any appropriate type of key or credential, as may comprise an elliptic curve digital signature algorithm (ECDSA) key, a Rivest-Shamir-Adelman (RSA) key, a multivariate cryptography key, a lattice-based cryptography key, a hash- or code-based cryptography key, and so on. In at least one embodiment a generated hash value for an individual frame can then be digitally signed using a public key for this system or entity. In at least one embodiment, a signed hash can be appended to this video file. In at least one embodiment video content, as a file or stream, can be transmitted or otherwise provided to a publisher system 112 in this example, such as over at least one network 110. Network(s) can include any appropriate network, such as an Internet, a cellular network, a wireless or wired network, and so on. In at least one embodiment, content might be captured or generated by a device that is part of a publisher system such that this transmission is not required. In at least one embodiment a publisher may act as a proxy, and a chain of custody can be determined. There may also be peer-to-peer (P2P) systems that can validate and transmit this information. In at least one embodiment, such a system can provide an application programming interface (API) that can be used to validate and transmit information, then automatically passing on a record of signatures to a relevant publisher.

In at least one embodiment video content is received, or otherwise obtained, by publisher system 112. In at least one embodiment, this publisher system may include a network of computing devices in at least one embodiment. Publisher system 112 can store data to a media repository 118 for subsequent analysis, or may store video data in memory or temporary storage and analyze data before storing video to a persistent repository. In at least one embodiment, publisher system 112 will include at least one verification and attestation module 114, system, or service, which is able to analyze or process received video content.

In at least one embodiment, keyframes of video content will be determined and hashes generated for content of those frames. In at least one embodiment hashes will be generated using a same hashing algorithm as was used to hash this video frame on a creator system, as may be indicated by metadata in video content. In at least one embodiment, hash values generated by verification module 114 can be compared against hashes stored in this video file (or stream) that was generated by creator system 102. In at least one embodiment, if hashes for all keyframes for a video file match, then a publisher can determine that video content has not been modified (at least for that segment of video) since its capture or generation by a creator system. It should be noted that there may be insignificant modifications to a video file, such as changes at a file level (as opposed to a data stream level) to a filename, that may not be reflected in hash values or determined to constitute significant changes. In at least one embodiment, a publisher system can also digitally sign hashes for keyframes using a private key associated with a publishing entity that can be appended to video frame as metadata, for example.

In at least one embodiment, video content can then be made available by a publisher system, such as by request from a consumer system 120 that is able to download, stream, or otherwise obtain and/or consume this content. In at least one embodiment video data can be downloaded to a consumer system 120 for playback through a media player application or device 122. In at least one embodiment, as part of a media player, or as a separate application or module, a media verification module 124 can be configured to analyze video content to determine aspects such as an identify of a publisher, an authenticity a source of completeness of video content, a verification that content has not been modified, or other such information. In at least one embodiment, a media verification module (which can be provided through hardware and/or software in consumer system 120) can analyze video to extract signed hashes for keyframes. In at least one embodiment this extraction and analysis can occur before or during playback in at least one embodiment. In at least one embodiment consumer system 120 may have, or obtain from publisher system 112, a public key that can be used to confirm digital signatures on hashes. In at least one embodiment, a consumer system would only verify a publisher signature using a public key of a publisher, since this publisher has already verified this creator signature. In at least one embodiment, only a hash value signed by a publisher is included in a distributed video file, with this publisher having removed a signed hash from creator system 102 once verified. In at least one embodiment, a hash value that was signed by a publisher can then be compared to a hash generated for a keyframe by a media verification module to determine whether these hash values match. In at least one embodiment, a same hashing algorithm can be used to ensure proper hash value generation for comparison. Matching values (or same hash values) being determined can indicate that video data contained in a video file, at least with respect to relevant keyframes, has not been modified since it was originally encoded. In at least one embodiment, information in a video file can also provide an identity of a creator system as well.

In at least one embodiment, while an approach based upon signed hash values provides a level of protection against improper modification, hash values themselves are subject to potential tampering. In at least one embodiment, signed hash values can be stored to a distributed ledger, such as a blockchain. In at least one embodiment such a ledger can include a list of blocks that are linked cryptographically, where each block includes a cryptographic hash of a prior block, along with a timestamp and data (often transaction data). In at least one embodiment, signed hash values for one or more keyframes can be stored to a block. In at least one embodiment, all signed hash values for a video file may be stored to a single block. In at least one embodiment, for video streams or other live transmissions, signed hashes can be stored to a block of a blockchain at regular intervals. In at least one embodiment, each block can include a hash of a previous block. In at least one embodiment, this may help to guard against sequential tampering, such as may result from removal of one or more frames from a section of video. In at least one embodiment, a distributed ledger comprising signed hashes of multiple adjacent encoded video frames can be appended to individual frames in video. In at least one embodiment, in an event that one or more frames were removed from a video stream or file, a break in this chain of hashes would be detected by media verification module 124 and/or media player 122. In at least one embodiment media player 122 could be configured to provide a notification any time a modification is detected. In at least one embodiment this can help to provide an indication to a user that this media is not as it was originally captured, which can be indicative of tampering or misrepresentation, although tampering or modification may not be important for certain types of media content. In at least one embodiment, a video playback application equipped with this technology can provide visual feedback in real-time to a viewer, such as by using a "padlock" symbol or icon used by web browsers to indicate authentic, secured web pages, or to display a verified identity of a publisher. In at least one embodiment, a media player can also be configured (as permitted by a consumer) to transmit information about modification to a publisher system.

Figure 2A:
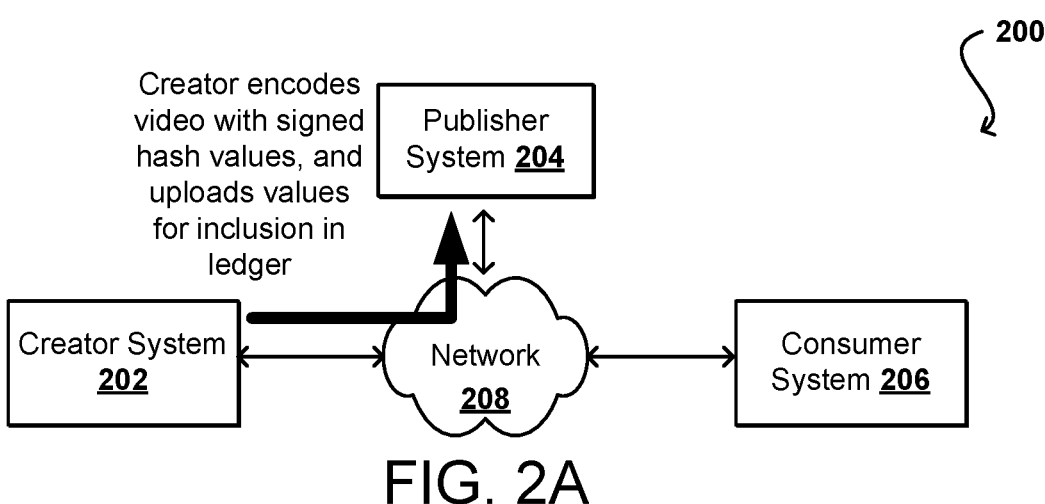
FIGS. 2A, 2B, and 2C illustrate example flows that can be utilized in a distribution and consumption of content, in at least one embodiment.
Figure 2B:
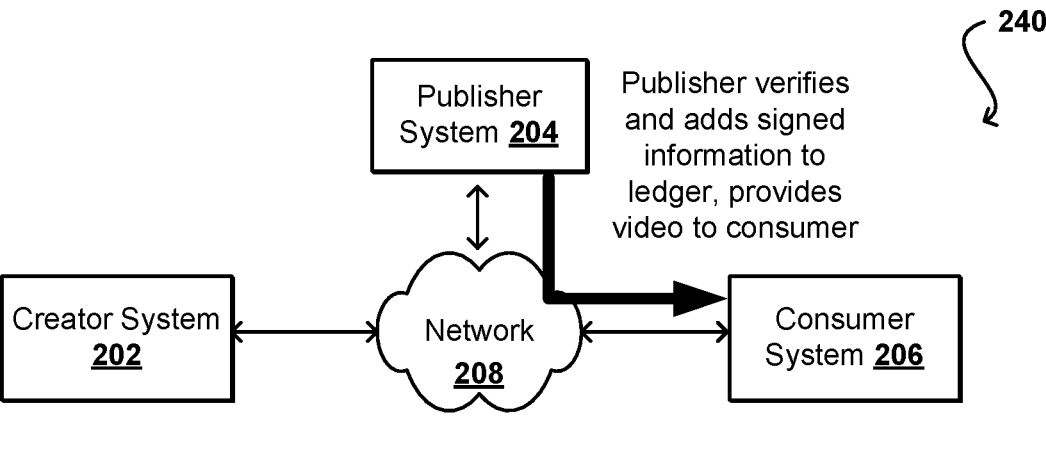
Figure 2C:
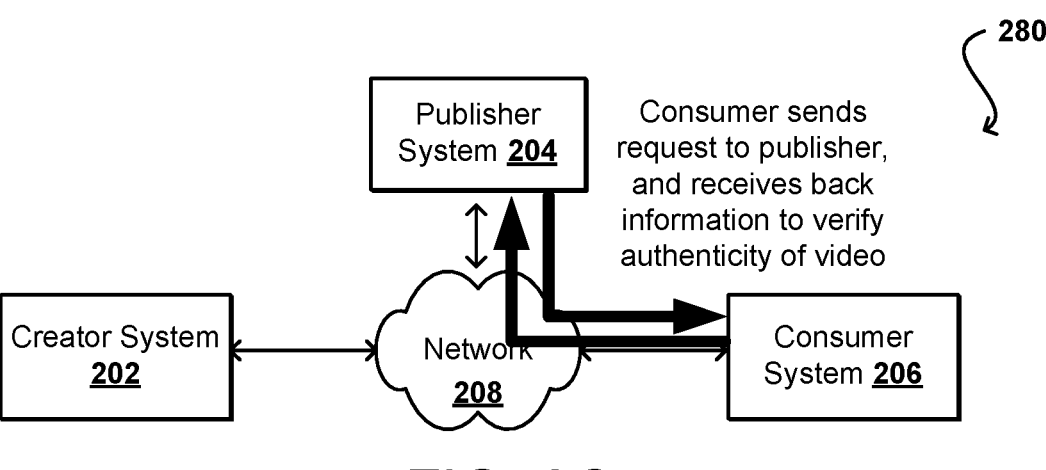

FIGS. 2A through 2C illustrate a high level flow for such a process in at least one embodiment. In at least one embodiment, such as may correspond to example situation 200 of FIG. 2A, a creator system 202 captures media content and encodes that content to a media file or stream, which is uploaded across at least one network 208 to a publisher system. In at least one embodiment a creator system will generate hash values for at least a subset of video frames, such as keyframes, and digitally sign those hash values with a private key for a creator. In at least one embodiment this is done in hardware with a key stored so as to be unable to be accessed or modified by a user, and in at least one embodiment this is done in software. In at least one embodiment, such as for example situation 240 of FIG. 2B, a publisher receiving content can use a public key for this creator (as may be provided by an encoder manufacturer) to verify a signature for authenticity of source. In at least one embodiment publisher system 204 can then generate hash values for relevant frames and compare these values against hash values appended to video frames by creator system 202. In at least one embodiment, if a signature is verified and hashes are determined to match, then this publisher can also sign hash values using a private key for this publisher. In at least one embodiment signed hash values can be stored to a block of a distributed ledger that can be associated with, part of, or separate from this video file. In at least one embodiment, hash values in a block will be hashed for inclusion in subsequent blocks so that any modification can be determined from a transaction or block history.

In at least one embodiment, such as example situation 280 of FIG. 2C, a consumer system 206 can obtain video content and can submit a request to a publisher system for a relevant public key, if this key is not already stored locally. In at least one embodiment a consumer system can obtain a key for use in verifying a digital signature to ensure source. In at least one embodiment a consumer system can also obtain access to a distributed ledger to get a sequence of hash values. In at least one embodiment this sequence can help to determine whether any frames are missing that were present in original video. In at least one embodiment a consumer system can also generate hash values for individual frames and compare those to hash values in a video file to determine whether there have been any modifications to content. In at least one embodiment, if source, completeness, and content are all verified then a consumer system can indicate that there has been no modification to content. In at least one embodiment, if any of these are not verified then a consumer system may take any of a number of actions, such as blocking or deleting content, providing a notification about content, attempting to repair content or obtain an unmodified copy, and so on. In at least one embodiment, there may be different flows as well, such as where a creator system is part of a publisher system, or where a consumer system obtains content from a third party source.

In at least one embodiment an ecosystem for media content can be created between entities such as publishers, creators, and consumers. In at least one embodiment, hardware such as one or more graphics processing units (GPUs) can be used in a video creation process to help generate hash values during an encoding process. In at least one embodiment, one or more verification processes can then be embedded into a publicly verifiable register, such as a blockchain. In at least one embodiment, such an approach provides a type of security mechanism for content, using signatures of a content creator and publisher that are verifiable to a consumer. In at least one embodiment, content can also be verified either via time or data.

In at least one embodiment, encoding and hashing will be performed in hardware only on original and unmodified content. In at least one embodiment, hashing can be performed on a set of keyframes, or video bracket. In at least one embodiment, binary data for individual frames can be hashed and digitally signed by any of a number of entities along a creation, transmission, and consumption path. In at least one embodiment a creator device can periodically upload a block of signatures to a publisher, as may depend in part upon a trust threshold determined by a content provider. In at least one embodiment, an upload may occur for a number of video brackets, every 180 seconds, after 6,000 frames, etc. Based at least in part upon a number of brackets uploaded, a determination can be made as to whether a file corresponds to an original source file. In at least one embodiment, while higher levels of security can be obtained by hashing a higher percentage of video frames, there can be some trade-off due to an additional resource capacity and processing power needed to perform additional hashing and verification. In at least one embodiment, an approach may depend in part upon a frame rate, as a frame rate of 24 fps or 30 fps may have a higher percentage of frames hashed than rates such as 60 fps or 120 fps. In at least one embodiment frames analyze may correspond to certain types of frames, such as keyframes or i-Frames, which may depend in part upon an encoding used.

In at least one embodiment such an approach can also enable any entity to verify content. In at least one embodiment content can be obtained, hashes generated and chained together, then verified at a specific keyframe. In at least one embodiment there can be content in metadata that indicates which frames include this information. In at least one embodiment, a "hash-chain" can be managed publicly, as with other distributed ledgers, either by a trusted third party or by a publishing entity. In at least one embodiment, a verifier having access to content can obtain access to a publisher blockchain, such as where a video indicates that it is from a particular publisher so a blockchain for that publisher can be accessed. In at least one embodiment a verifier can analyze a hash and signature for a specific frame in a specific video, and if it is a match then this content can be verified. In at least one embodiment this verification can be done online or offline. In at least one embodiment, a calculation does not need to be explicitly trusted, although it can be performed on a GPU, or other such hardware, in order to assist with tamper prevention. In at least one embodiment verification can be performed at time of creation as valid at two levels, including that content is entirely original and intact from a source device, and where assertions are only from a creator and not also, or alternatively, from a publisher.

In at least one embodiment, a blockchain for a video can be updated in a number of different ways by a number of different entities. In at least one embodiment, a blockchain can be updated by a publisher who "owns" a blockchain and operates as an entity of trust with respect to this blockchain. In at least one embodiment a content producer with an appropriate encoder, or a content consumer that can query a publisher blockchain, can also potentially modify this blockchain. In at least one embodiment a content producer can generate hashes with signatures using a GPU, with use of hardware functionality preventing tampering on creation. In at least one embodiment a content producer can then upload original content with metadata and frames with chained hashes and signatures. In at least one embodiment a publisher receiving content can farm out activity to others for verification using original content. In at least one embodiment, on successes there can be verification into a blockchain for this video hash, producing a single, verifiable hash including total content information. In at least one embodiment subjection can be retried on failure. In at least one embodiment, once verified information can be published on a blockchain by signature of publisher. In at least one embodiment this may include rewards for content producers or consumers, depending on who is doing verification. In at least one embodiment a content consumer obtaining video content can choose how often to verify, such as via specific metadata in frames and download chunks of this blockchain.

In at least one embodiment such verification capability can defend against a variety of types of possible attacks. In at least one embodiment, such an approach could detect a context editing attack, such as where a ten second snippet is provide that causes quotes to be taken out of context. In at least one embodiment an editing removal attack could also be detected, such as where specific sections of content have been removed. In at least one embodiment an editing content attack could also be detected, such as may correspond to modifications of subsections of content, such as deepfake modifications of faces or other such representations in media. In at least one embodiment, a reputation vector verification can be provided, such as a verification of authenticity where a specific publisher endorses a specific video in a specific form. In at least one embodiment there can verification of a particular data source, as may relate to a content creator or publisher. In at least one embodiment approaches provide for public verification of unmodified data, as tampering will be evident through such a process. In at least one embodiment, integrity checking can be performed using a trust threshold with respect to frequency or approach, etc. In at least one embodiment a hash is performed on an encoded payload and not an actual frame. In at least one embodiment, video compression data in a particular encoding (e.g., H.264) that is contained would be hashed, rather than a bitmap image for this frame. In at least one embodiment a stream of milestones can be autonomously verified. In at least one embodiment this can be performed using AES-GCM GMAC in a blockchain that runs parallel with current content at intervals of keyframes. In at least one embodiment this is open to being re-encrypted by a third party as well.

Figure 3:
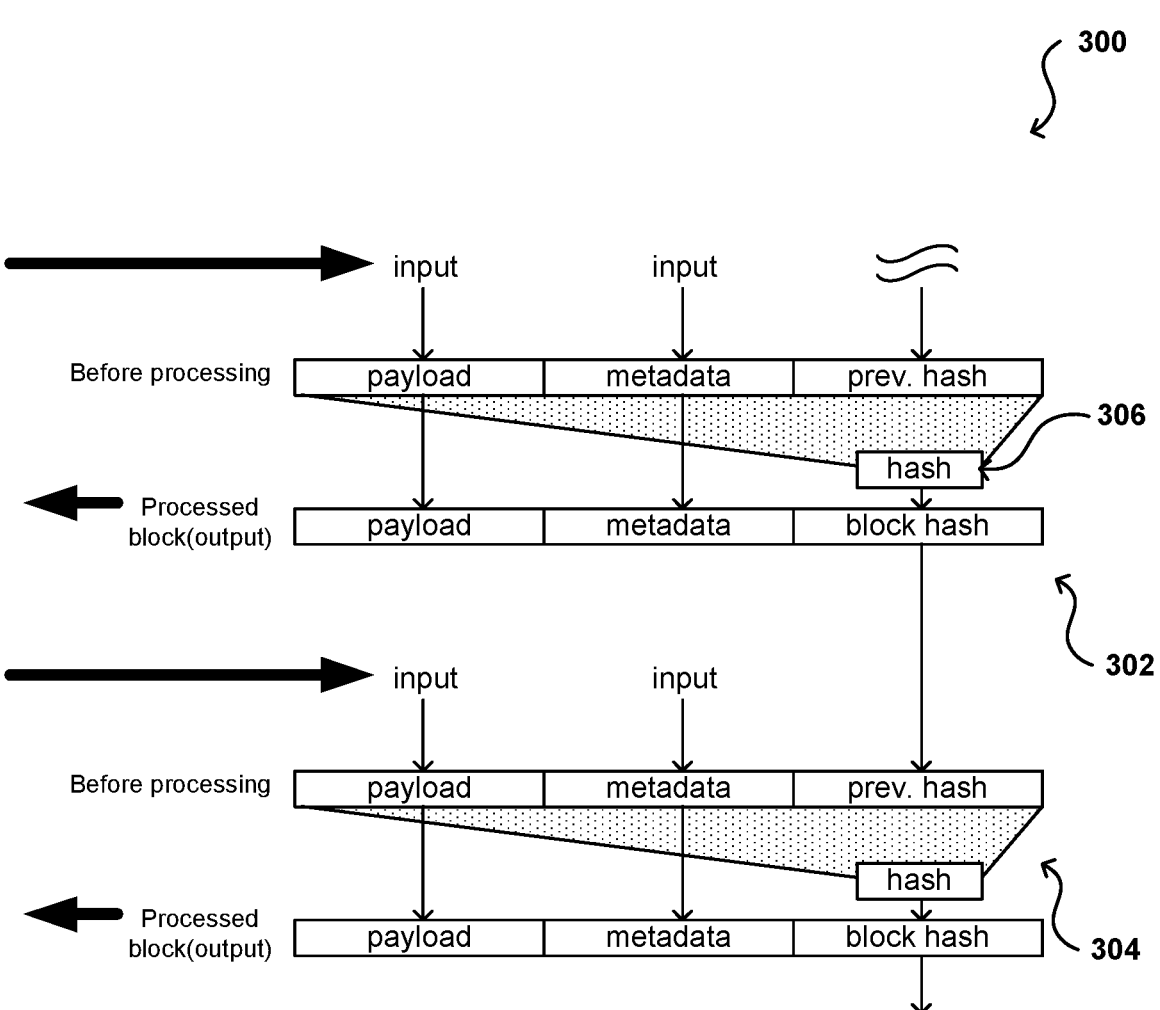
FIG. 3 illustrates an example approach to updating a distributed ledger, in at least one embodiment.

FIG. 3 illustrates and example blockchain process 300 in at least one embodiment. This process will be described with respect to example media data as discussed herein. In at least one embodiment input can be provided in a first step 302 that can include both input data that will be written to a payload partition, and input metadata that will be written to a metadata portion. In at least one embodiment, input data will include signed hashes of encoded media data for a video file. In at least one embodiment, during processing payload and metadata will be combined with a previous hash value for a blockchain, including information for all previous updates, and a new hash 306 generated that can be written to this blockchain as a new block resulting from processing of newly received data. In at least one embodiment, when additional data is received, such as one or more subsequent signed hashes for a video file, input as payload and metadata can be combined with a previous hash value that corresponds to hash value 306 generated in a prior step, to generate a new hash for a currently generated block. In at least one embodiment, using such a process, information for any update will be determinable because a hash for any given block in a chain is a function of all earlier blocks in that chain. In at least one embodiment, any modification to a blockchain can be readily determinable by analyzing hash values for various blocks.

Figure 4A:
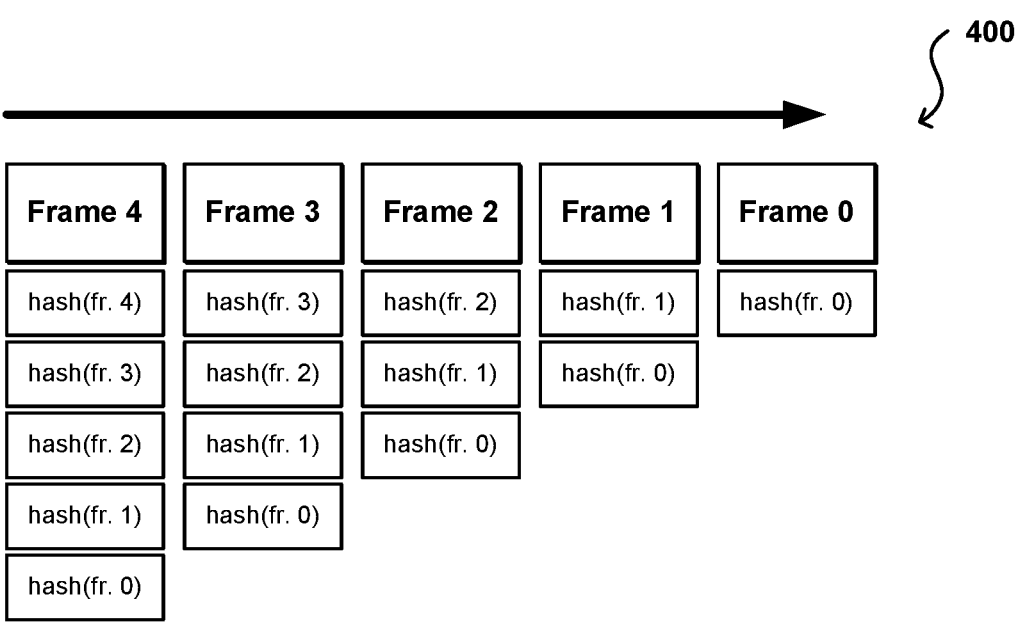
FIGS. 4A and 4B illustrates impact of frame removal on a distributed ledger, in at least one embodiment.
Figure 4B:
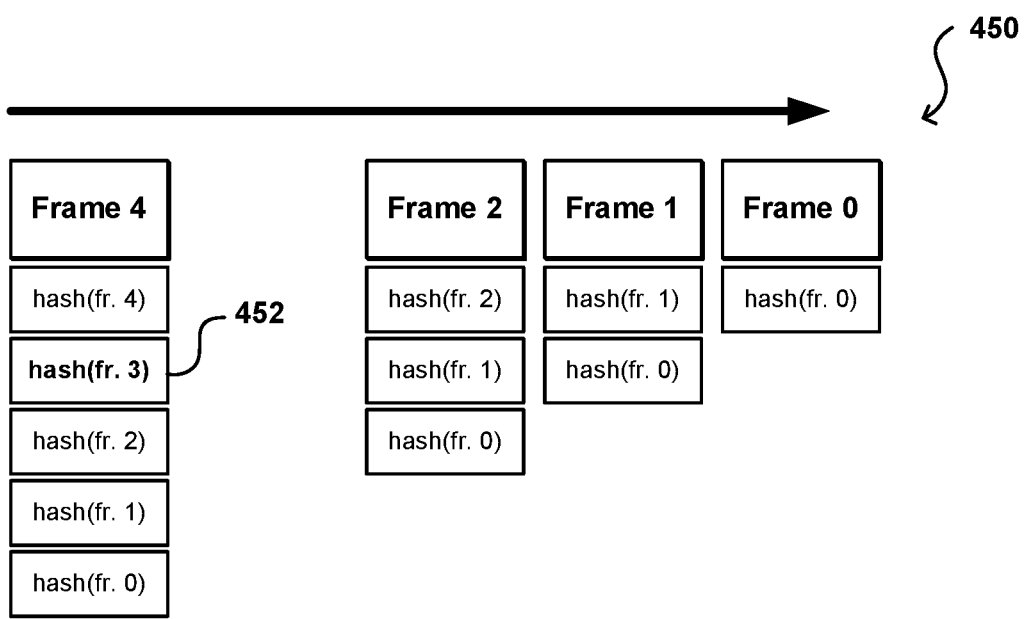

FIGS. 4A and 4B illustrate an example situation in which removal of at least a keyframe (or other hashed frame) can be determined in at least one embodiment. In at least one embodiment, such as may correspond to example situation 400 of FIG. 4A, a set of frames (which may be a subset of frames of a video sequence) have been analyzed and had their hashes generated. In at least one embodiment, hash values can be appended to frames as metadata, such that metadata for each frame includes hashes for all previous frames in a sequence. In at least one embodiment, such as may correspond to example situation 450 of FIG. 4B, a frame (Frame 3) has been removed from a video sequence. In at least one embodiment a missing frame can be detected at least based on a hash value 452 for a missing frame being included in metadata appended to a subsequent frame in this sequence. In at least one embodiment, removal of Frame 3 from a sequence by an external entity would cause comparison of Frame 4 hashes to current and previous frames to not match, whereby tampering could be detected.

In at least one embodiment a system can utilize a video codec incorporating elements of blockchain-style signed Public-Key hashes, as frame metadata, to guard against malicious tampering with video files or streams to mislead or defraud a viewer of this content. In at least one embodiment, examples include modification of e-sports videos, crash camera footage, and video streams on news sites. In at least one embodiment it is possible to synthesize artificial footage using a data training set. In at least one embodiment this threat is remediated by use of blockchain and public-key infrastructure (PKI) technologies. In at least one embodiment, use of a Public-key digital signature will ensure an identity of an author of a video fie or stream, while hashes generated from encoded frames of video data will ensure that no alterations to or substitutions of encoded frame data has been made to video after it was published by an original author.

In at least one embodiment, a hash of encoded frame data will be calculated for each frame of a video file/stream. In at least one embodiment, this hash can be digitally signed by a private key (RSA/ECDSA) of a publishing entity, and this signed hash appended to a video frame as part of an output. In at least one embodiment a media player can use this scheme in at least one embodiment to determine provenance, as a digital signature ensures that a video file/stream encoded by an entity from which it is claimed that a video file/stream originated. In at least one embodiment a player can also determine frame integrity, as once a signature of a hash accompanying a video frame has been processed, a hash for a frame payload can be compared to that actual frame payload received in a player. In at least one embodiment a player can also determine sequence integrity, as in a fully realized system signed hashes of multiple adjacent video frames will form a hash-chain appended to each frame. In at least one embodiment, by comparing hashes of each frame in a chain to a sequence of hashes calculated, a playback or other processing application in at least one embodiment can verify that sections of a video file/stream have not been removed. In at least one embodiment corresponding to FIGS. 4A and 4B, for a frame sequence F0,F1, F2,F3, and F4, Frame F4 would contain digital hashes of all five frames (F0-F4).

In at least one embodiments, for a seek operation within a file or stream, that seek would need to take account of a length of a frame-hash-chain in at least one embodiment, and this seek would need to proceed to a beginning of a hash chain to build up a hash history required for successful verification of playback from a target frame. In at least one embodiment where a hash-chain is four frames long, a seek to target frame 4 in at least one embodiment would instead seek to target frame 1 to compute comparison hashes for frames 1,2,3, and then read and decode frame 4 comparing a complete computed hash chain for frame 4 against a transmitted hash chain received with frame 4.

In at least one embodiment, a real-time playback application could then offer a visual indicator, like a "padlock" symbol displayed in web browsers for verified HTTPS sites, with different states to indicate at least certain determinations. In at least one embodiment, notification may be provided that a current video file or stream has been confirmed as genuine. In at least one embodiment, details of a signing certificate and chain could also be displayed by a playback application. In at least one embodiment, notification may also be provided that a current video file or stream may be untrusted as no signed metadata is present. In a least one embodiment, a notification may be provided that a current video file or stream should not be trusted as mismatches have been detected. In at least one embodiment, for UDP video streams over networks with potential packet loss, buffered playback that has been fully corrected can be used in at least one embodiment such that lost frames due to packet loss or interference will trigger a warning state that video being viewed may not be trusted. In high integrity scenarios this may advantageously ensure that a potential for any missing information is brought to an attention of a viewer.

In at least one embodiment a system can be applicable for rights verification, whereby a user could receive a stream with signatures that are validated against a chain of authority, based on a signature of each validated frame. In at least one embodiment a distribution of frame hashes can be performed, using an optimization of at least one embodiment discussed above. In at least one embodiment a creation of a metadata standard can be performed in at least one embodiment that is useful for security properties, content rights as mentioned, content properties such as GPS, frame number, creation/modified date, other device identifiers, etc. In at least one embodiment a system can provide for an application execution audit trail. In at least one embodiment a record of actions taken in an offline capacity can be 'framed' and collected into verifiable blocks using an identifier provided by a server and bound to a client. In at least one embodiment this can become a basis for a unique challenge response system on said actions, which then become public (locally or otherwise) record. In at least one embodiment, blocks are validated at key points by a server and managed by a policy, but a computational validation can be done asynchronously based on a block-like fashion of these data structure(s). In at least one embodiment a valid series of actions is counter signed and put into a record. In at least one embodiment use-cases may include banking audit trails, to offline game-play for what are currently online-only games. In at least one embodiment, extensible application stream verification can be performed, as systems discussed herein can encompass audio data, for example, wherein each channel on an audio stream could be verified using a similar set of frames, if within a same window. In at least one embodiment a system can support core functionality, allowing for use of normal video controls, such as 'seek'. In at least one embodiment, functionality can be provided through use of at least one graphics processing unit (GPU). In at least one embodiment GPU hardware can be used to accelerate secure encoding of video files and streams. In at least one embodiment GPU acceleration can be utilized for real-time video stream encode and delivery. In at least one embodiment GPU hardware can provide verification that video data has not been tampered with after initial generation by a third party.

FIG. 5 illustrates an example process 500 in at least one embodiment. It should be understood for this and other processes discussed herein that there can be additional, alternative, or fewer steps performed in similar or alternative orders, or in parallel. Further, this example discusses media data including audio and video, but as discussed elsewhere herein there can be various types of data that can take advantage of systems described herein. In at least one embodiment, a frame of video content is captured 502, such as by using a camera and microphone of a creator device. In at least one embodiment, video content is encoded 504 using an appropriate encoding and compression scheme as discussed herein. In at least one embodiment, during encoding a hash value can be generated 506 for encoded content in a video frame. In at least one embodiment a hash value can be generated using any appropriate hashing (or other) algorithm as discussed herein. In at least one embodiment a generated hash value can be digitally signed 508 using a private key, which may be specific to a capture device and provided in hardware, in at least one embodiment. In at least one embodiment a digital signature can help provide a verifiable indication of source in at least one embodiment. In at least one embodiment a signed hash value can be appended 510 to a video frame, although a signed hash can be embedded or associated with video content in other ways in at least one embodiment. In at least one embodiment content can be stored locally or transmitted from a device, and external access to a video file or stream including a video frame can be provided 512, whether being transmitted to a specific recipient, exposed to peer devices, or posted to a central media server.

Figure 6:
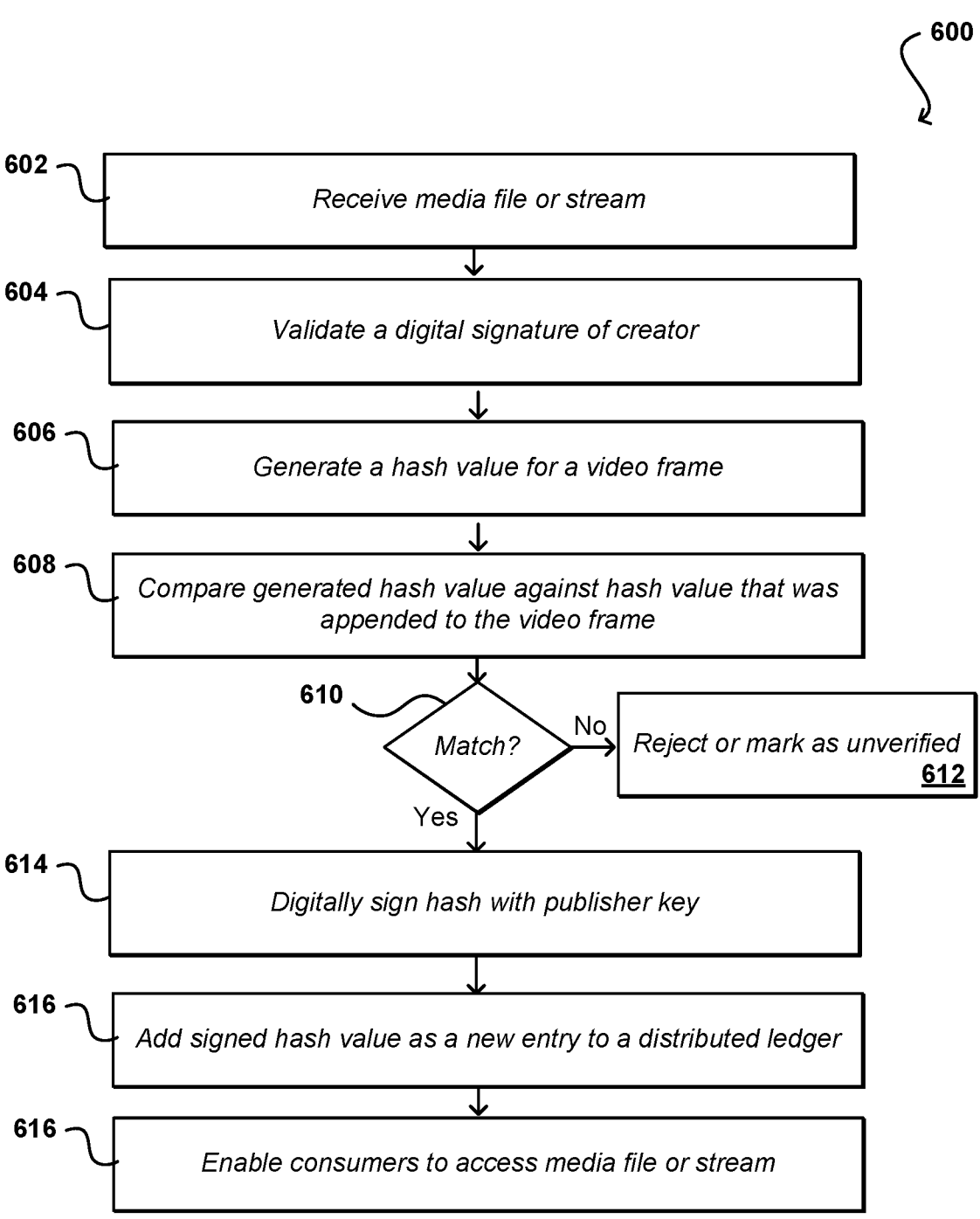
FIG. 6 illustrates an example process for verifying media content before publishing to consumers, in at least one embodiment.

FIG. 6 illustrates an example process 600 that may be performed by a publisher system in at least one embodiment.

In at least one embodiment a media stream or file is received 602, and in a case of a stream or other transmission may be received over a period of time. In at least one embodiment a digital signature of a creator of content can be validated 604, as may involve using a public key to decode at least some of this content. In at least one embodiment a hash value can be generated 606 for a video frame in this content. In at least one embodiment this can involve analyzing content to determine a video frame for which a hash has been generated and embedded in this content, and generating a hash value for that video frame. In at least one embodiment a generated hash value can be compared 608 against an embedded hash value for that video frame in at least one embodiment, and a determination can be made 610 as to whether these hash values match, or are a same value. In at least one embodiment, if these values do not match, then this file or stream can be rejected, or at least marked or denoted, 612 as unverified. In at least one embodiment this content may be accepted but classified as modified or unverified and handled accordingly. In at least one embodiment, if these values match then this hash value can be digitally signed 614 with a private key of a publisher, and a signed hash value can be embedded in a media stream or file, and/or added 616 as a new entry to a distributed ledger. In at least one embodiment, a new entry to a distributed ledger will be based on all prior video frame hashes in order to provide assurance that no modification of content is performed. In at least one embodiment consumers can then be enabled 616 to access this media file, such as by downloading or streaming this content.

Figure 7:
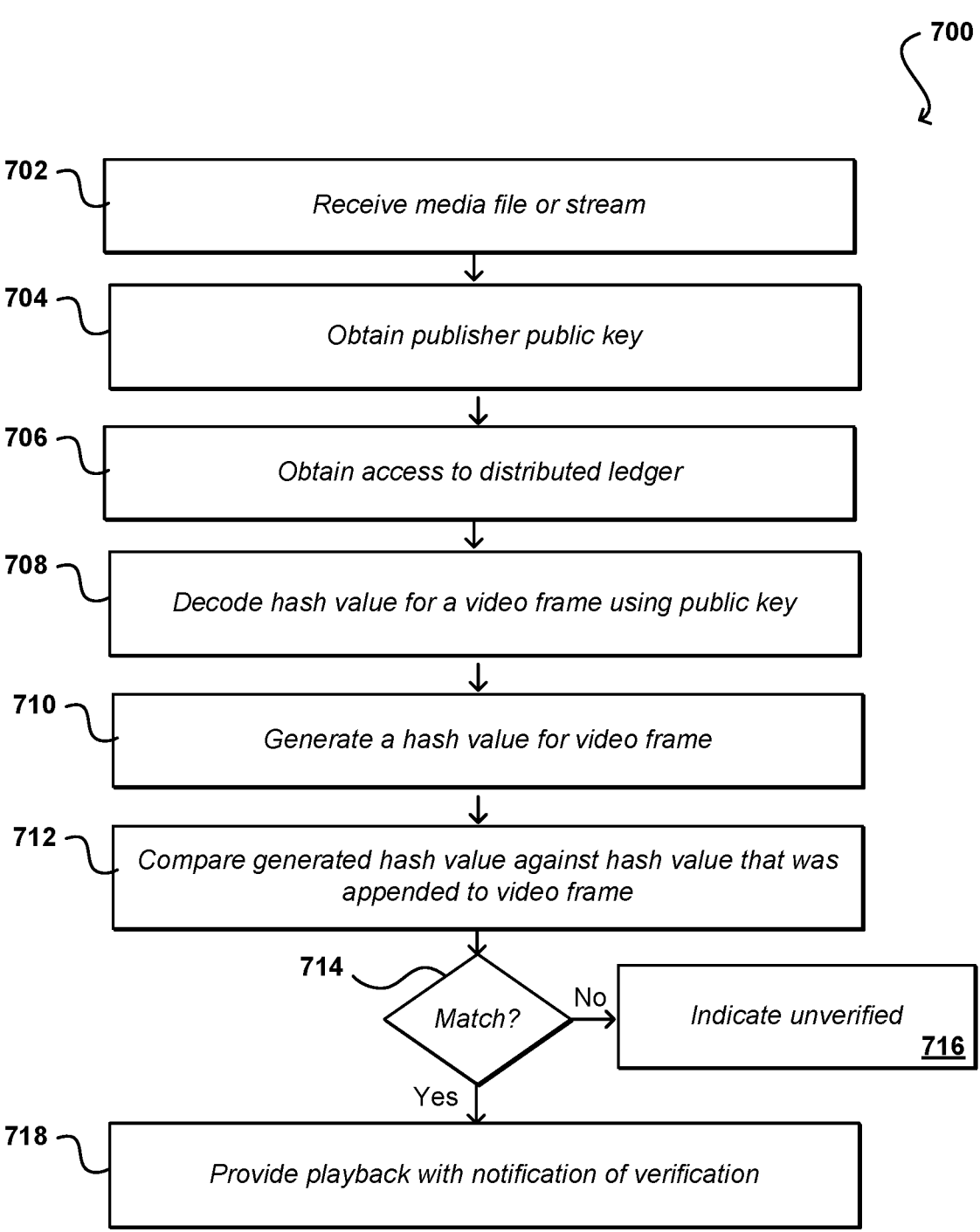
FIG. 7 illustrates an example process for determining authenticity of media content, in at least one embodiment.

FIG. 7 illustrates an example process 700 that may be performed by a consumer system or device in at least one embodiment. In at least one embodiment, a media file is received 702 that is provided by a publisher entity. In at least one embodiment, a consumer system can obtain 704 a public key of a publisher and obtain 706 access to a distributed ledger for a publisher/media if not already obtained. In at least one embodiment, a hash value for a video frame can be decoded 708 using a public key for a publisher, in order to verify a source of content. In at least one embodiment a hash value for a video frame can be generated 710 using an appropriate hashing algorithm, as may be indicated in this media file or otherwise. In at least one embodiment a generated hash value can be compared 712 against a hash value that was appended to this video file, or included in a distributed ledger. In at least one embodiment, if it is determined 714 that these values do not match then it can be indicated 716 that this content is unverified. In at least one embodiment this content might be played with an indication of an unverified state, or playback might require user approval. In at least one embodiment, if these values are determined to match, then playback of this media file or stream can be provided 718 along with a notice of verification, authentication, and/or source, among other information discussed herein. In at least one embodiment signed hash information enables a player to determine that content is attested by a publisher to have specific signatures at specific points, such as key frames in video. In at least one embodiment, at an end of content there can also be a sequence that indicates via signature that an entire file is verified.

Data Center

FIG. 8 illustrates an example data center 800, in which at least one embodiment may be used. In at least one embodiment, data center 800 includes a data center infrastructure layer 810, a framework layer 820, a software layer 830 and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 822 may configure or otherwise control one or more node C.R.s 816(1)-816(N) and/or grouped computing resources 814. In at least one embodiment, resource orchestrator 822 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 832, a configuration manager 834, a resource manager 836 and a distributed file system 838. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. In at least one embodiment, configuration manager 834 may be capable of configuring different layers such as software layer 830 and framework layer 820 including Spark and distributed file system 838 for supporting large-scale data processing. In at least one embodiment, resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. In at least one embodiment, resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used.

In at least one embodiment, any of configuration manager 834, resource manager 836, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

In accordance with at least one embodiment, data center infrastructure 810 can receive input text and cause that input to be directed to corresponding components of application layer 840 and software layer 830 for purposes of training and/or inferencing as discussed herein.

Computer Systems

Figure 9:
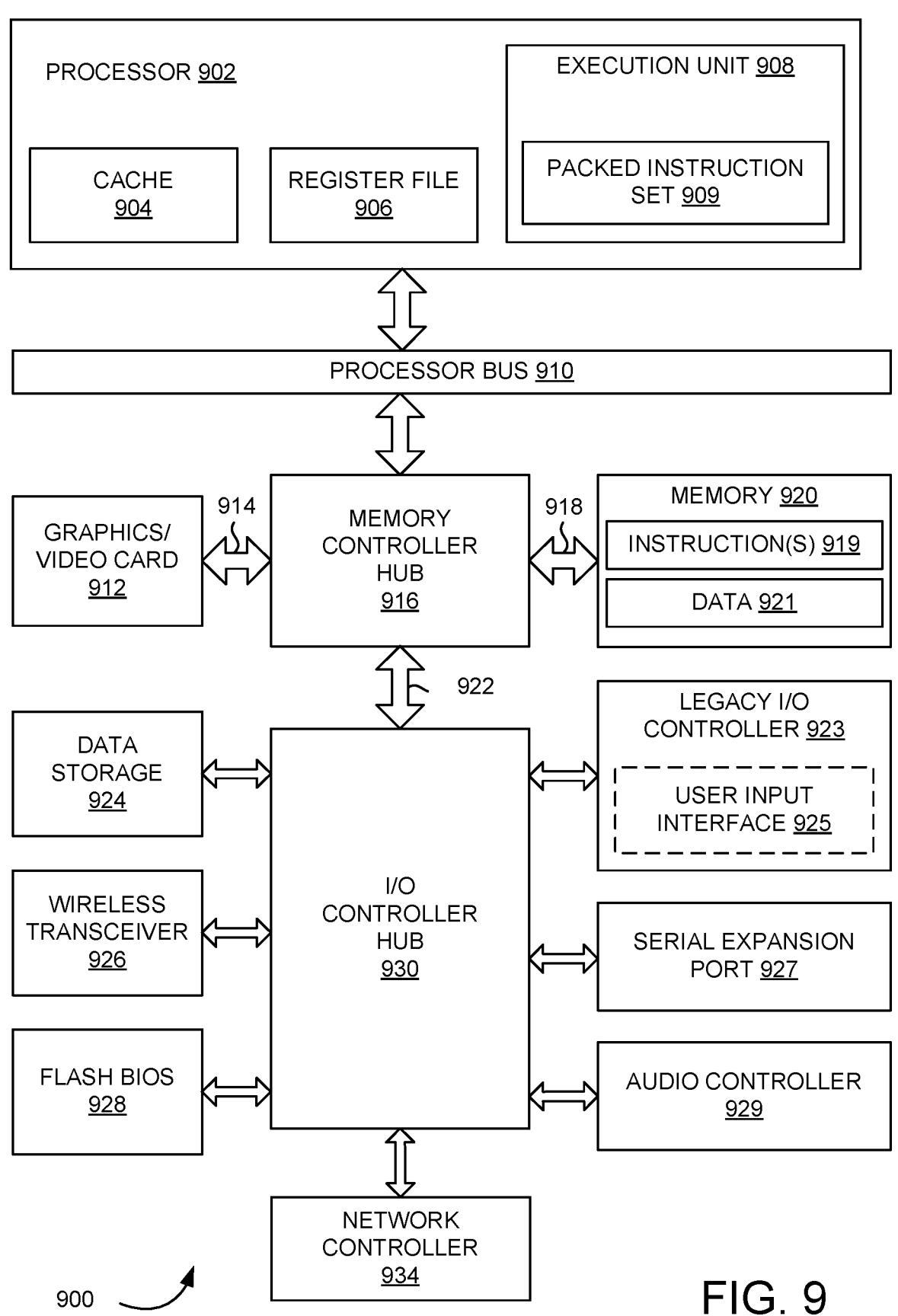
FIG. 9 is a block diagram illustrating a computer system, in at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, in at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, the system is a single processor desktop or server system, but in another embodiment the system may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. Processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set

909 in instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. Memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9A illustrates a system, which includes interconnected hardware devices or "chips", whereas in other embodiments, FIG. 9A may illustrate an exemplary System on a Chip ("SoC"). In at least one embodiment, devices illustrated in FIG. 9A may be interconnected with proprietary interconnects, standardized interconnects (e.g., PCIe) or some combination thereof. In at least one embodiment, one or more components of system 900 are interconnected using compute express link (CXL) interconnects.

In some embodiments, the video data stream may be received over an expansion port 927 or wireless transceiver 926, for example, then directed to the processor 902 and/or video graphics card 912 for processing. Depending on whether the components are part of a device such as an autonomous vehicle or a separate device, the output could then go to a control system via the I/O or transmitted to the vehicle via the wireless transceiver.

Figure 10:
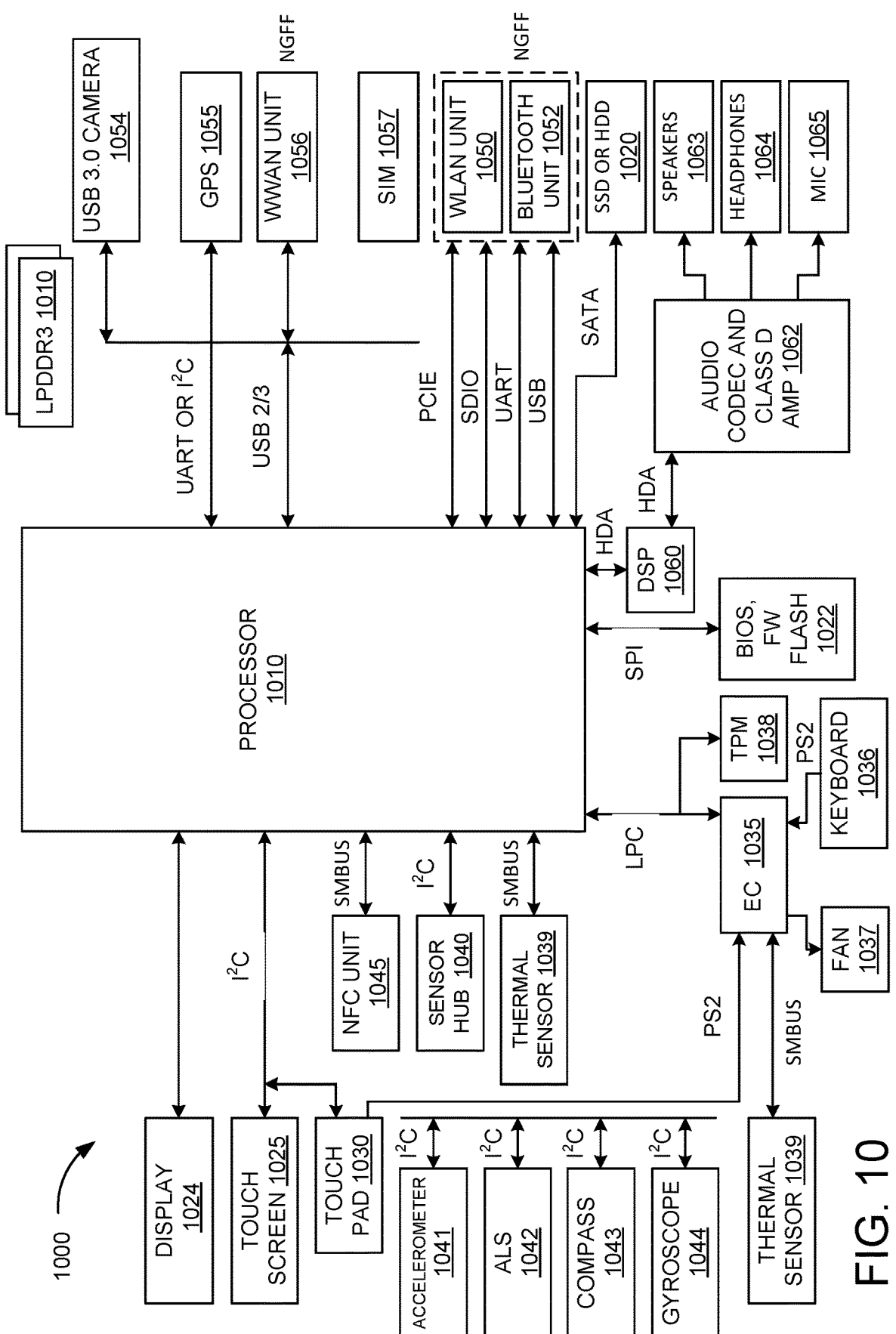
FIG. 10 is a block diagram illustrating computer system, in at least one embodiment.

FIG. 10 is a block diagram illustrating an electronic device 1000 for utilizing a processor 1010, in at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive "SSD or HDD") 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, a headphones 1064, and a microphone ("mic") 1065 may be communicatively coupled to an audio unit ("audio codec and class d amp") 1064, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Figure 11:
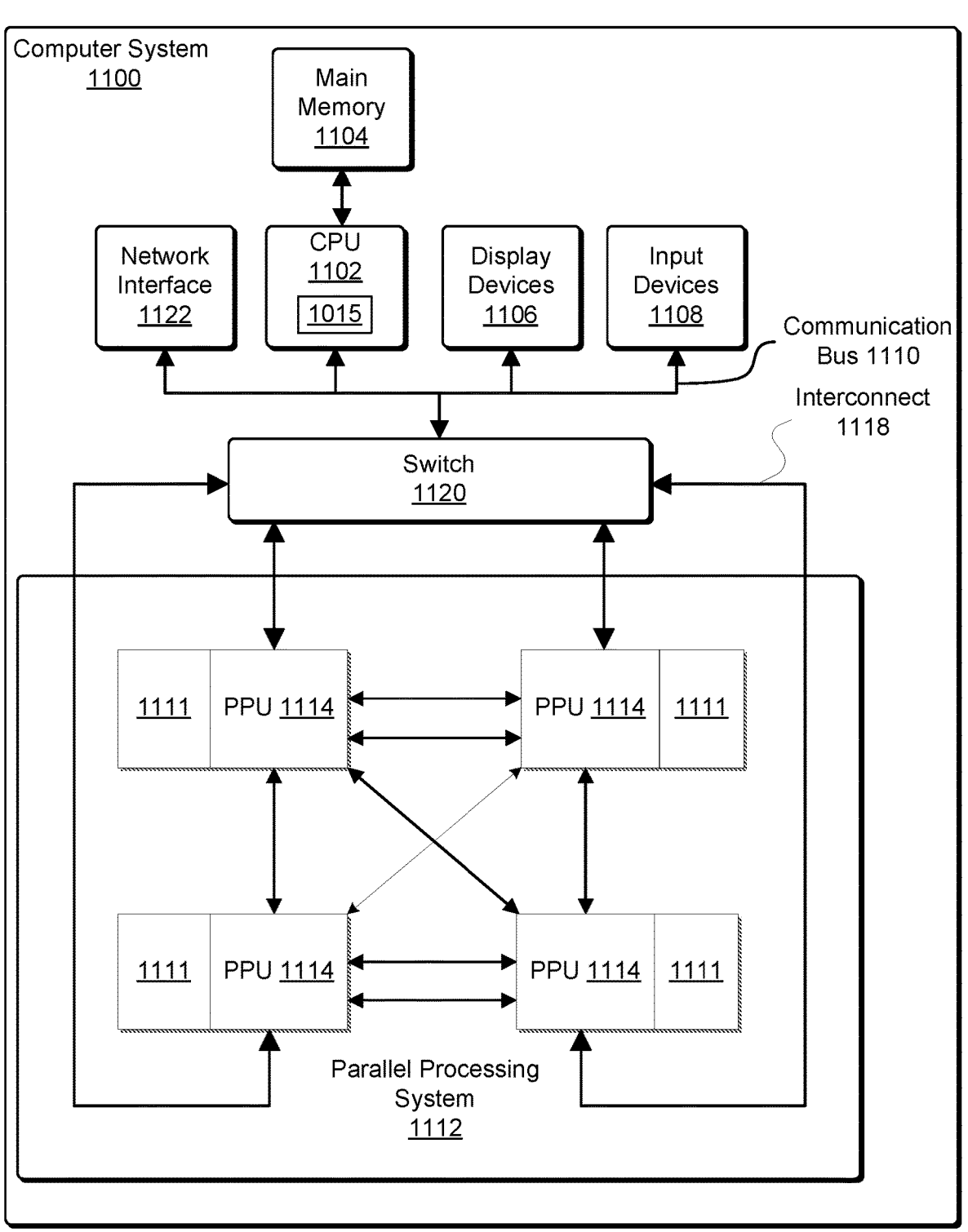
FIG. 11 illustrates a computer system, in at least one embodiment.

FIG. 11 illustrates a computer system 1100, in at least one embodiment. In at least one embodiment, computer system 1100 is configured to implement various processes and methods described throughout this disclosure.

In at least one embodiment, computer system 1100 comprises, without limitation, at least one central processing unit ("CPU") 1102 that is connected to a communication bus 1110 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1100 includes, without limitation, a main memory 1104 and control logic (e.g., implemented as hardware, software, or a combination thereof) and data are stored in main memory 1104 which may take form of random access memory ("RAM"). In at least one embodiment, a network interface subsystem ("network interface") 1122 provides an interface to other computing devices and networks for receiving data from and transmitting data to other systems from computer system 1100.

In at least one embodiment, computer system 1100, in at least one embodiment, includes, without limitation, input devices 1108, parallel processing system 1112, and display devices 1106 which can be implemented using a cathode ray tube ("CRT"), liquid crystal display ("LCD"), light emitting diode ("LED"), plasma display, or other suitable display technologies. In at least one embodiment, user input is received from input devices 1108 such as keyboard, mouse, touchpad, microphone, and more. In at least one embodiment, each of foregoing modules can be situated on a single semiconductor platform to form a processing system.

Figure 12:
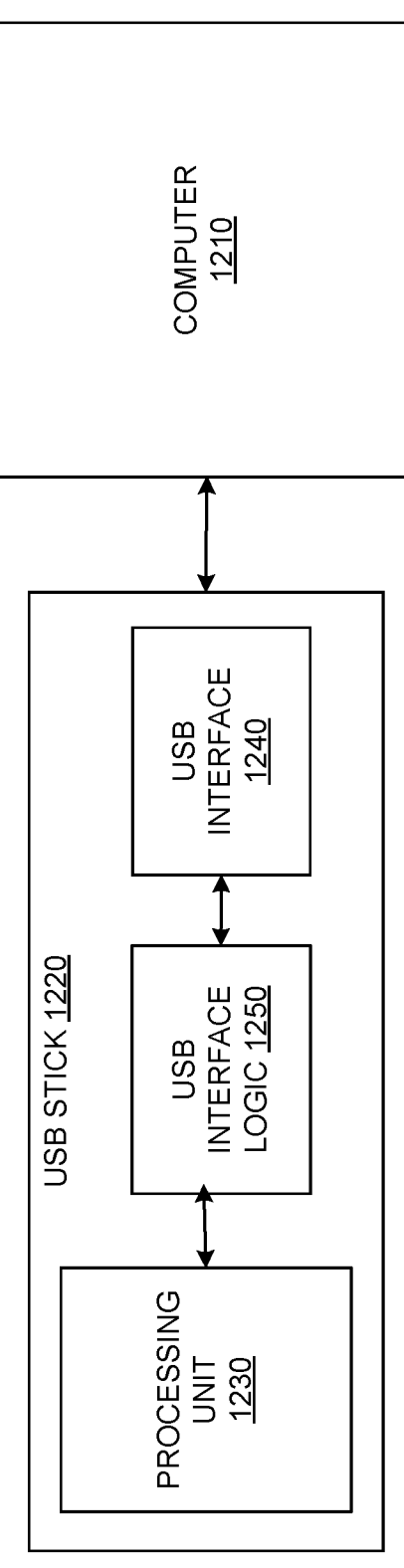
FIG. 12 illustrates a computer system, according at least one embodiment.

FIG. 12 illustrates a computer system 1200, in at least one embodiment. In at least one embodiment, computer system 1200 includes, without limitation, a computer 1210 and a USB stick 1220. In at least one embodiment, computer 1210 may include, without limitation, any number and type of processor(s) (not shown) and a memory (not shown). In at least one embodiment, computer 1210 includes, without limitation, a server, a cloud instance, a laptop, and a desktop computer.

In at least one embodiment, USB stick 1220 includes, without limitation, a processing unit 1230, a USB interface 1240, and USB interface logic 1250. In at least one embodiment, processing unit 1230 may be any instruction execution system, apparatus, or device capable of executing instructions. In at least one embodiment, processing unit 1230 may include, without limitation, any number and type of processing cores (not shown). In at least one embodiment, processing core 1230 comprises an application specific integrated circuit ("ASIC") that is optimized to perform any amount and type of operations associated with machine learning. For instance, in at least one embodiment, processing core 1230 is a tensor processing unit ("TPC") that is optimized to perform machine learning inference operations. In at least one embodiment, processing core 1230 is a vision processing unit ("VPU") that is optimized to perform machine vision and machine learning inference operations.

In at least one embodiment, USB interface 1240 may be any type of USB connector or USB socket. For instance, in at least one embodiment, USB interface 1240 is a USB 3.0 Type-C socket for data and power. In at least one embodiment, USB interface 1240 is a USB 3.0 Type-A connector. In at least one embodiment, USB interface logic 1250 may include any amount and type of logic that enables processing unit 1230 to interface with or devices (e.g., computer 1210) via USB connector 1240.

Figure 13:
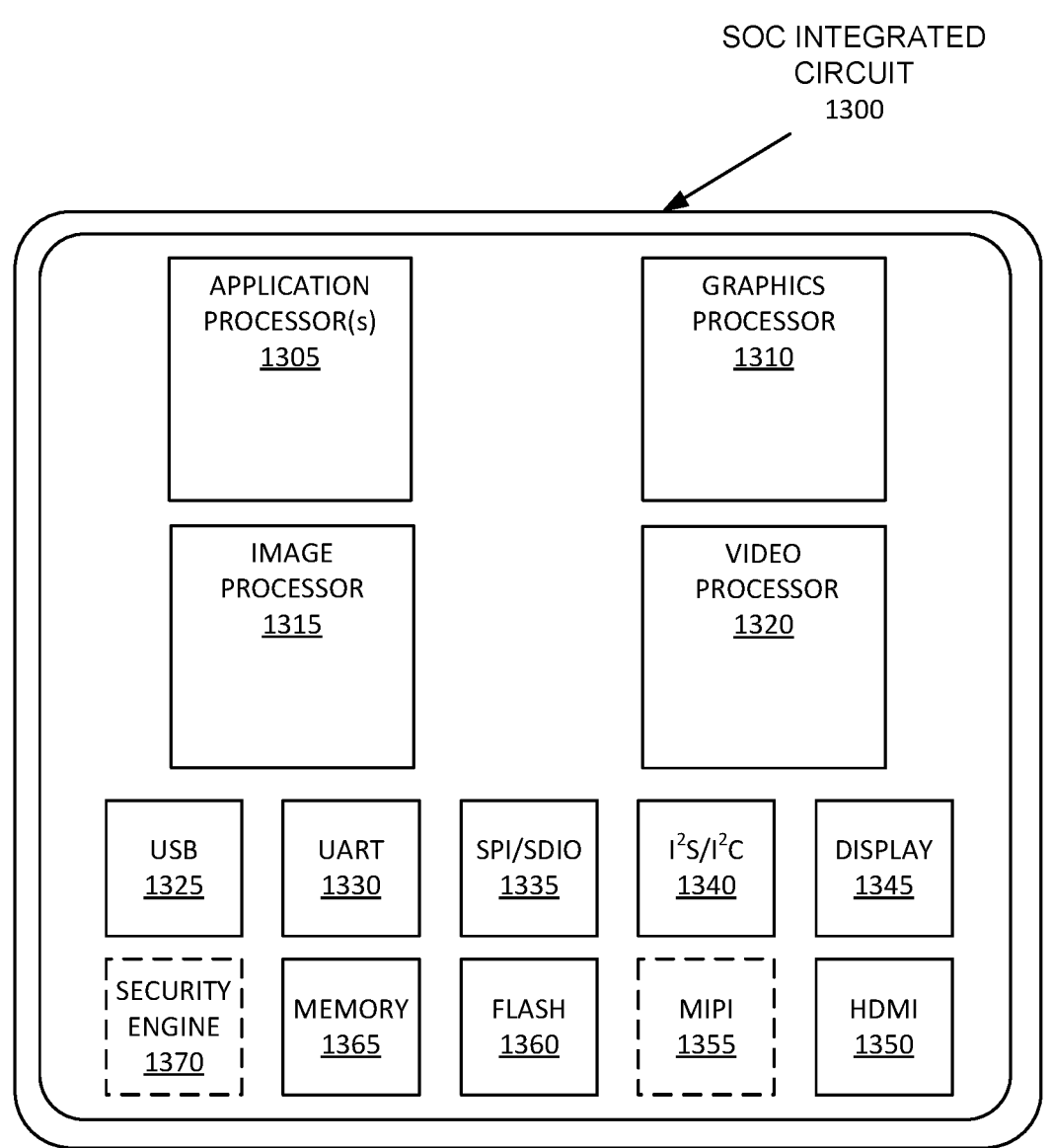
FIG. 13 illustrates exemplary integrated circuits and associated graphics processors that may be fabricated using one or more IP cores, in at least one embodiment.

FIG. 13 is a block diagram illustrating an exemplary system on a chip integrated circuit 1300 that may be fabricated using one or more IP cores, in at least one embodiment. In at least one embodiment, integrated circuit 1300 includes one or more application processor(s) 1305 (e.g., CPUs), at least one graphics processor 1310, and may additionally include an image processor 1315 and/or a video processor 1320, any of which may be a modular IP core. In at least one embodiment, integrated circuit 1300 includes peripheral or bus logic including a USB controller 1325, UART controller 1330, an SPI/SDIO controller 1335, and an I.sup.2S/I.sup.2C controller 1340. In at least one embodiment, integrated circuit 1300 can include a display device 1345 coupled to one or more of a high-definition multimedia interface (HDMI) controller 1350 and a mobile industry processor interface (MIPI) display interface 1355. In at least one embodiment, storage may be provided by a flash memory subsystem 1360 including flash memory and a flash memory controller. In at least one embodiment, memory interface may be provided via a memory controller 1365 for access to SDRAM or SRAM memory devices. In at least one embodiment, some integrated circuits additionally include an embedded security engine 1370.

Figure 14A:
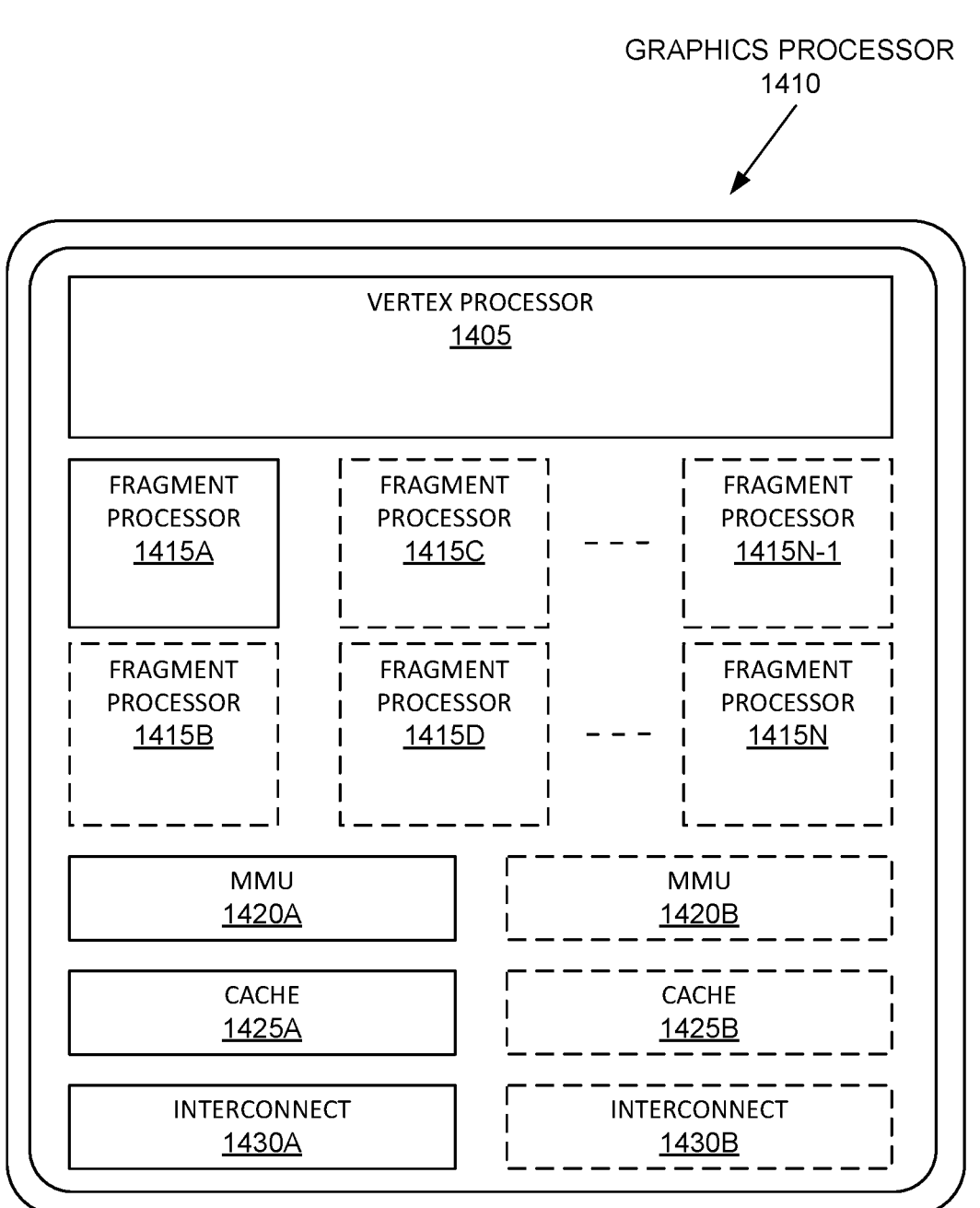
FIGS. 14A-14B illustrate exemplary integrated circuits and associated graphics processors that may be fabricated using one or more IP cores, in at least one embodiment.
Figure 14B:
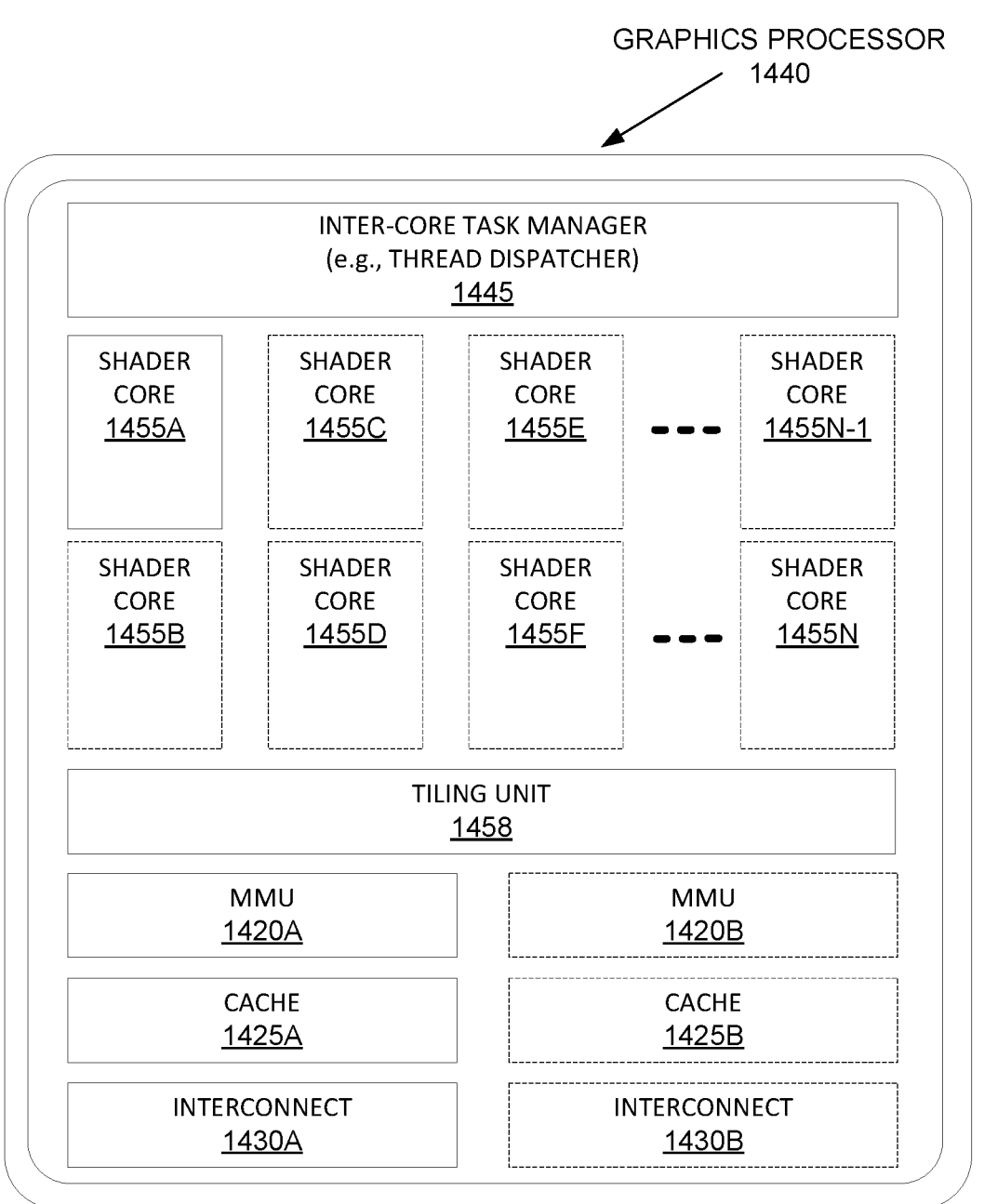

FIGS. 14A-14B illustrate exemplary integrated circuits and associated graphics processors that may be fabricated using one or more IP cores, in at least one embodiment described herein. In addition to what is illustrated, other logic and circuits may be included in at least one embodiment, including additional graphics processors/cores, peripheral interface controllers, or general-purpose processor cores.

FIGS. 14A-14B are block diagrams illustrating exemplary graphics processors for use within an SoC, according to embodiments described herein. FIG. 14A illustrates an exemplary graphics processor 1410 of a system on a chip integrated circuit that may be fabricated using one or more IP cores, in at least one embodiment. FIG. 14B illustrates an additional exemplary graphics processor 1440 of a system on a chip integrated circuit that may be fabricated using one or more IP cores, in at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of graphics processor 1310 of FIG. 13.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more memory management units (MMUs) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within system, including one or more MMUs associated with one or more application processor(s) 1805, image processors 1815, and/or video processors 1820 of FIG. 18, such that each processor 1805-1820 can participate in a shared or unified virtual memory system. In at least one embodiment, one or more circuit interconnect(s) 1430A-1430B enable graphics processor 1410 to interface with other IP cores within SoC, either via an internal bus of SoC or via a direct connection.

In at least one embodiment, graphics processor 1440 includes one or more MMU(s) 1420A-1420B, caches 1425A-1425B, and circuit interconnects 1430A-1430B of graphics processor 1410 of FIG. 14A. In at least one embodiment, graphics processor 1440 includes one or more shader core(s) 1455A-1455N (e.g., 1455A, 1455B, 1455C, 1455D, 1455E, 1455F, through 1455N-1, and 1455N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

Figure 15A:
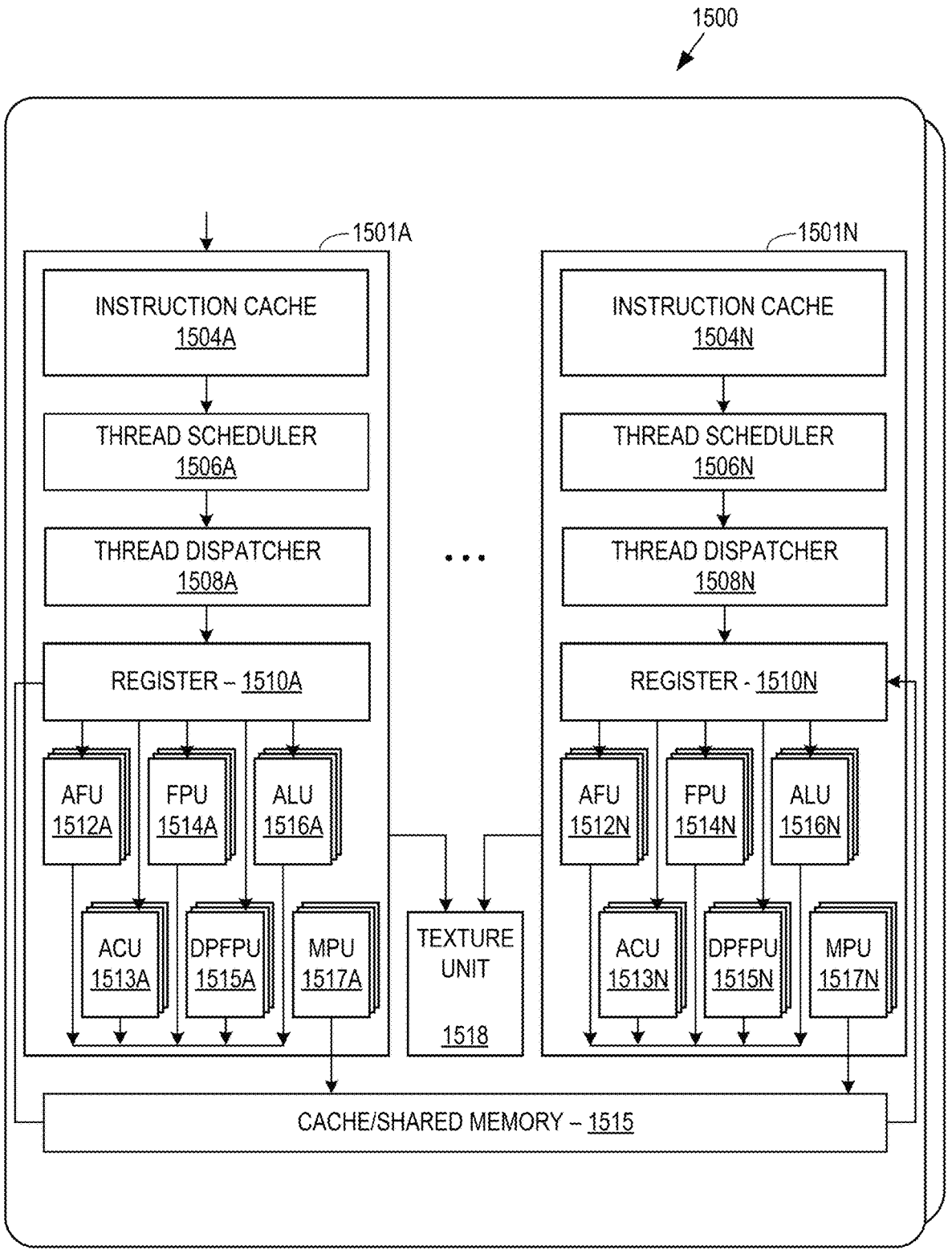
FIGS. 15A-15B illustrate additional exemplary graphics processor logic in at least one embodiment.
Figure 15B:
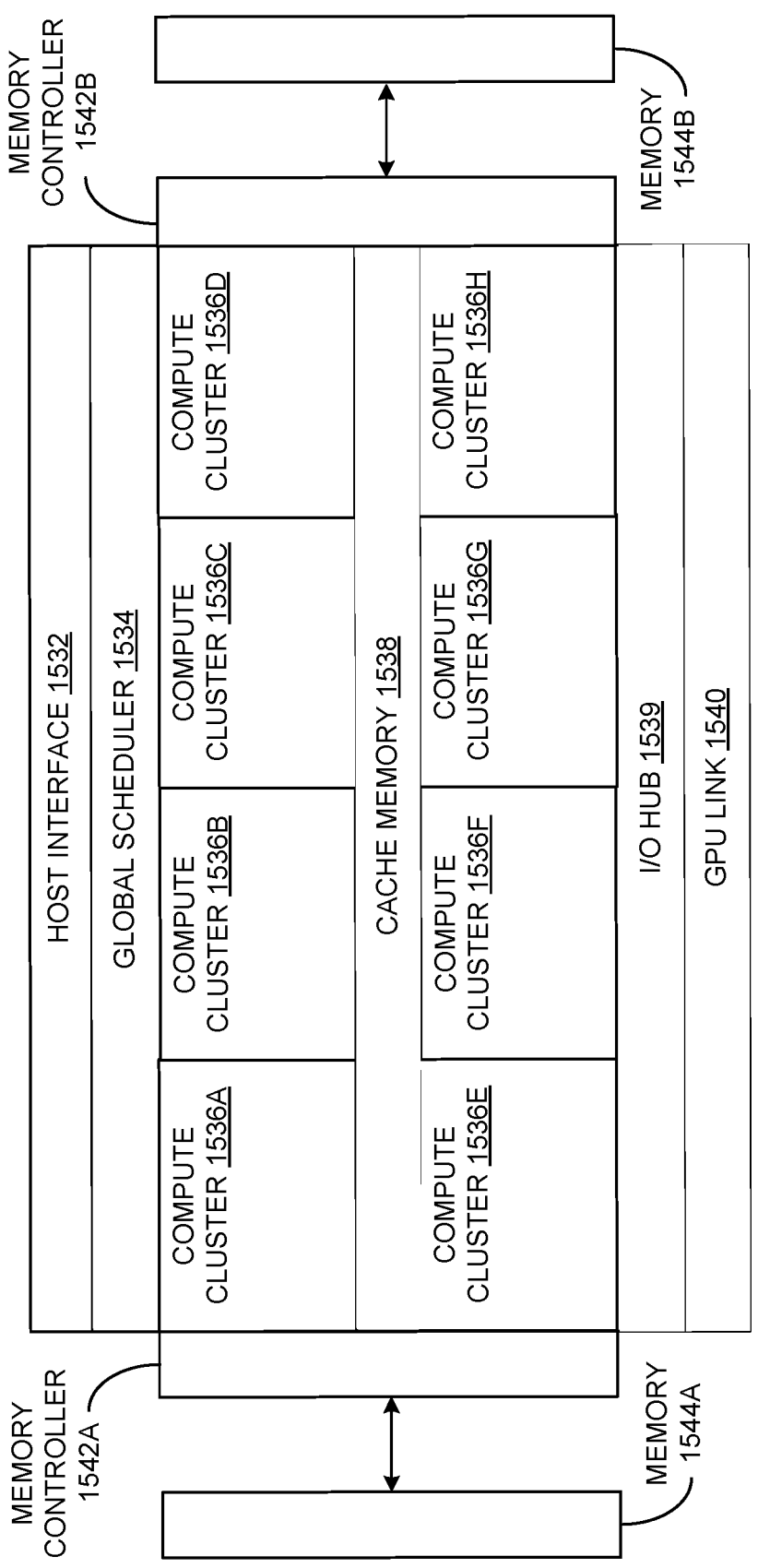

FIGS. 15A-15B illustrate additional exemplary graphics processor logic according to embodiments described herein. FIG. 15A illustrates a graphics core 1500 that may be included within graphics processor 1810 of FIG. 18, in at least one embodiment, and may be a unified shader core 1455A-1455N as in FIG. 14B in at least one embodiment. FIG. 15B illustrates a highly-parallel general-purpose graphics processing unit 1530 suitable for deployment on a multi-chip module in at least one embodiment.

In one embodiment, graphics core 1500 includes a shared instruction cache 1502, a texture unit 1518, and a cache/shared memory 1520 that are common to execution resources within graphics core 1500. In one embodiment, graphics core 1500 can include multiple slices 1501A-1501N or partition for each core, and a graphics processor can include multiple instances of graphics core 1500. Slices 1501A-1501N can include support logic including a local instruction cache 1504A-1504N, a thread scheduler 1506A-1506N, a thread dispatcher 1508A-1508N, and a set of registers 1510A-1510N. In one embodiment, slices 1501A-1501N can include a set of additional function units (AFUs

1512A-1512N), floating-point units (FPU 1514A-1514N), integer arithmetic logic units (ALUs 1516-1516N), address computational units (ACU 1513A-1513N), double-precision floating-point units (DPFPU 1515A-1515N), and matrix processing units (MPU 1517A-1517N).

In one embodiment, FPUs 1514A-1514N can perform single-precision (32-bit) and half-precision (16-bit) floating point operations, while DPFPUs 1515A-1515N perform double precision (64-bit) floating point operations. In one embodiment, ALUs 1516A-1516N can perform variable precision integer operations at 8-bit, 16-bit, and 32-bit precision, and can be configured for mixed precision operations. In one embodiment, MPUs 1517A-1517N can also be configured for mixed precision matrix operations, including half-precision floating point and 8-bit integer operations. In one embodiment, MPUs 1517-1517N can perform a variety of matrix operations to accelerate machine learning application frameworks, including enabling support for accelerated general matrix to matrix multiplication (GEMM). In one embodiment, AFUs 1512A-1512N can perform additional logic operations not supported by floating-point or integer units, including trigonometric operations (e.g., Sine, Cosine, etc.).

FIG. 15B illustrates a general-purpose processing unit (GPGPU) 1530 that can be configured to enable highly-parallel compute operations to be performed by an array of graphics processing units, in at least one embodiment. In at least one embodiment, GPGPU 1530 can be linked directly to other instances of GPGPU 1530 to create a multi-GPU cluster to improve training speed for deep neural networks. In at least one embodiment, GPGPU 1530 includes a host interface 1532 to enable a connection with a host processor. In at least one embodiment, host interface 1532 is a PCI Express interface. In at least one embodiment, host interface 1532 can be a vendor specific communications interface or communications fabric. In at least one embodiment, GPGPU 1530 receives commands from a host processor and uses a global scheduler 1534 to distribute execution threads associated with those commands to a set of compute clusters 1536A-1536H. In at least one embodiment, compute clusters 1536A-1536H share a cache memory 1538. In at least one embodiment, cache memory 1538 can serve as a higher-level cache for cache memories within compute clusters 1536A-1536H.

In at least one embodiment, GPGPU 1530 includes memory 1544A-1544B coupled with compute clusters 1536A-1536H via a set of memory controllers 1542A-1542B. In at least one embodiment, memory 1544A-1544B can include various types of memory devices including dynamic random access memory (DRAM) or graphics random access memory, such as synchronous graphics random access memory (SGRAM), including graphics double data rate (GDDR) memory.

In at least one embodiment, compute clusters 1536A-1536H each include a set of graphics cores, such as graphics core 1500 of FIG. 15A, which can include multiple types of integer and floating point logic units that can perform computational operations at a range of precisions including suited for machine learning computations. For example, in at least one embodiment, at least a subset of floating point units in each of compute clusters 1536A-1536H can be configured to perform 16-bit or 32-bit floating point operations, while a different subset of floating point units can be configured to perform 64-bit floating point operations.

In at least one embodiment, multiple instances of GPGPU 1530 can be configured to operate as a compute cluster. In at least one embodiment, communication used by compute clusters 1536A-1536H for synchronization and data exchange varies across embodiments. In at least one embodiment, multiple instances of GPGPU 1530 communicate over host interface 1532. In at least one embodiment, GPGPU 1530 includes an I/O hub 1539 that couples GPGPU 1530 with a GPU link 1540 that enables a direct connection to other instances of GPGPU 1530. In at least one embodiment, GPU link 1540 is coupled to a dedicated GPU-to-GPU bridge that enables communication and synchronization between multiple instances of GPGPU 1530. In at least one embodiment GPU link 1540 couples with a high speed interconnect to transmit and receive data to other GPGPUs or parallel processors. In at least one embodiment, multiple instances of GPGPU 1530 are located in separate data processing systems and communicate via a network device that is accessible via host interface 1532. In at least one embodiment GPU link 1540 can be configured to enable a connection to a host processor in addition to or as an alternative to host interface 1532.

In at least one embodiment, GPGPU 1530 can be configured to train neural networks. In at least one embodiment, GPGPU 1530 can be used within a inferencing platform. In at least one embodiment, in which GPGPU 1530 is used for inferencing, GPGPU may include fewer compute clusters 1536A-1536H relative to when GPGPU is used for training a neural network. In at least one embodiment, memory technology associated with memory 1544A-1544B may differ between inferencing and training configurations, with higher bandwidth memory technologies devoted to training configurations. In at least one embodiment, the inferencing configuration of GPGPU 1530 can support inferencing specific instructions. For example, in at least one embodiment, an inferencing configuration can provide support for one or more 8-bit integer dot product instructions, which may be used during inferencing operations for deployed neural networks.

Figure 16:
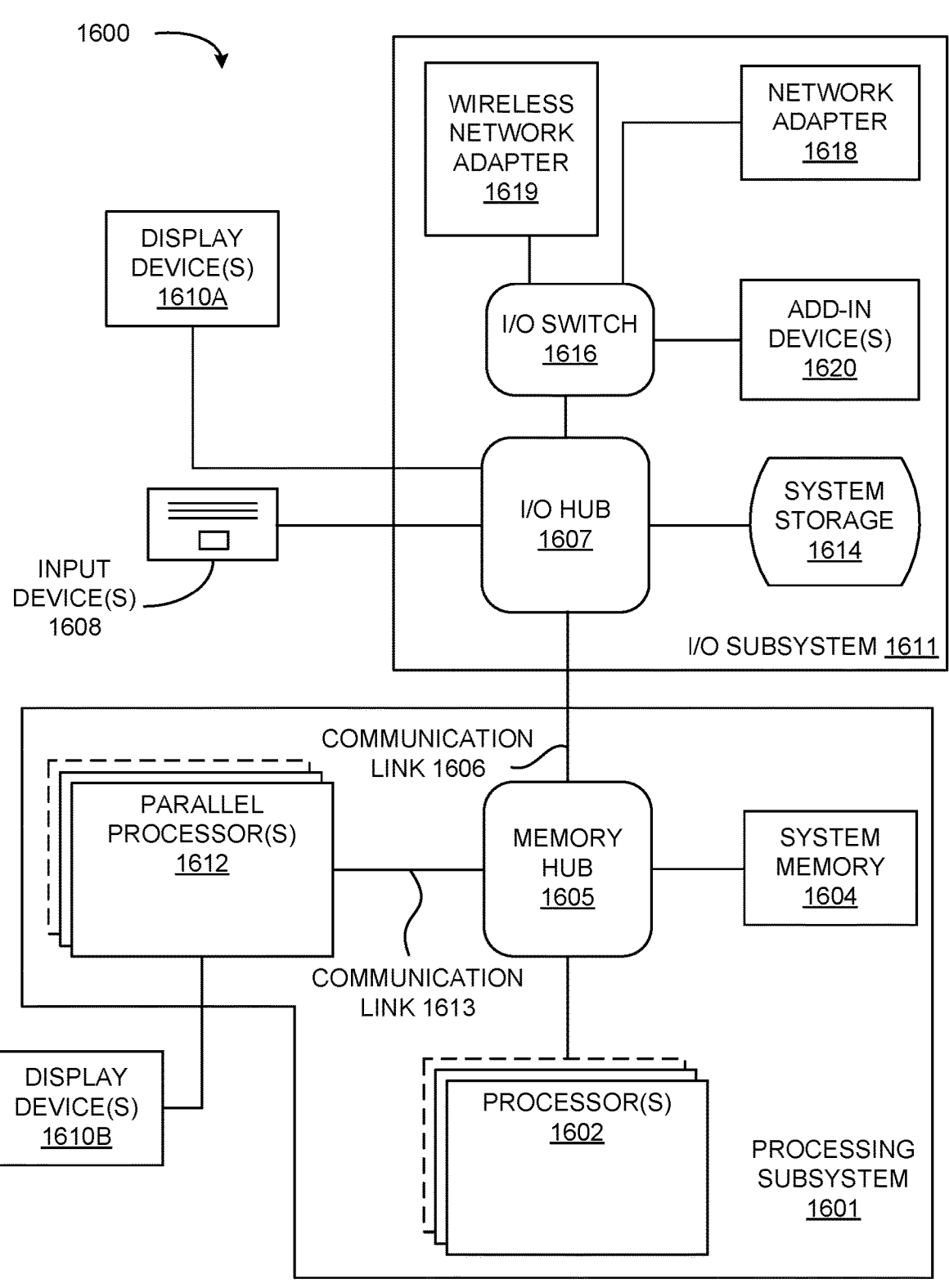
FIG. 16 illustrates a computer system, in at least one embodiment.

FIG. 16 is a block diagram illustrating a computing system 1600 in at least one embodiment. In at least one embodiment, computing system 1600 includes a processing subsystem 1601 having one or more processor(s) 1602 and a system memory 1604 communicating via an interconnection path that may include a memory hub 1605. In at least one embodiment, memory hub 1605 may be a separate component within a chipset component or may be integrated within one or more processor(s) 1602. In at least one embodiment, memory hub 1605 couples with an I/O subsystem 1611 via a communication link 1606. In at least one embodiment, I/O subsystem 1611 includes an I/O hub 1607 that can enable computing system 1600 to receive input from one or more input device(s) 1608. In at least one embodiment, I/O hub 1607 can enable a display controller, which may be included in one or more processor(s) 1602, to provide outputs to one or more display device(s) 1610A. In at least one embodiment, one or more display device(s) 1610A coupled with I/O hub 1607 can include a local, internal, or embedded display device.

In at least one embodiment, processing subsystem 1601 includes one or more parallel processor(s) 1612 coupled to memory hub 1605 via a bus or other communication link 1613. In at least one embodiment, communication link 1613 may be one of any number of standards based communication link technologies or protocols, such as, but not limited to PCI Express, or may be a vendor specific communications interface or communications fabric. In at least one embodiment, one or more parallel processor(s) 1612 form a computationally focused parallel or vector processing system that can include a large number of processing cores and/or processing clusters, such as a many integrated core (MIC) processor. In at least one embodiment, one or more parallel processor(s) 1612 form a graphics processing subsystem that can output pixels to one of one or more display device(s) 1610A coupled via I/O Hub 1607. In at least one embodiment, one or more parallel processor(s) 1612 can also include a display controller and display interface (not shown) to enable a direct connection to one or more display device(s) 1610B.

In at least one embodiment, a system storage unit 1614 can connect to I/O hub 1607 to provide a storage mechanism for computing system 1600. In at least one embodiment, an I/O switch 1616 can be used to provide an interface mechanism to enable connections between I/O hub 1607 and other components, such as a network adapter 1618 and/or wireless network adapter 1619 that may be integrated into a platform, and various other devices that can be added via one or more add-in device(s) 1620. In at least one embodiment, network adapter 1618 can be an Ethernet adapter or another wired network adapter. In at least one embodiment, wireless network adapter 1619 can include one or more of a Wi-Fi, Bluetooth, near field communication (NFC), or other network device that includes one or more wireless radios.

In at least one embodiment, computing system 1600 can include other components not explicitly shown, including USB or other port connections, optical storage drives, video capture devices, and the like, may also be connected to I/O hub 1607. In at least one embodiment, communication paths interconnecting various components in FIG. 16 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 1612 incorporate circuitry optimized for graphics and video processing, including, for example, video output circuitry, and constitutes a graphics processing unit (GPU). In at least one embodiment, one or more parallel processor(s) 1612 incorporate circuitry optimized for general purpose processing. In at least embodiment, components of computing system 1600 may be integrated with one or more other system elements on a single integrated circuit. For example, in at least one embodiment, one or more parallel processor(s) 1612, memory hub 1605, processor(s) 1602, and I/O hub 1607 can be integrated into a system on chip (SoC) integrated circuit. In at least one embodiment, components of computing system 1600 can be integrated into a single package to form a system in package (SIP) configuration. In at least one embodiment, at least a portion of components of computing system 1600 can be integrated into a multi-chip module (MCM), which can be interconnected with other multi-chip modules into a modular computing system.

Processors

Figure 17:
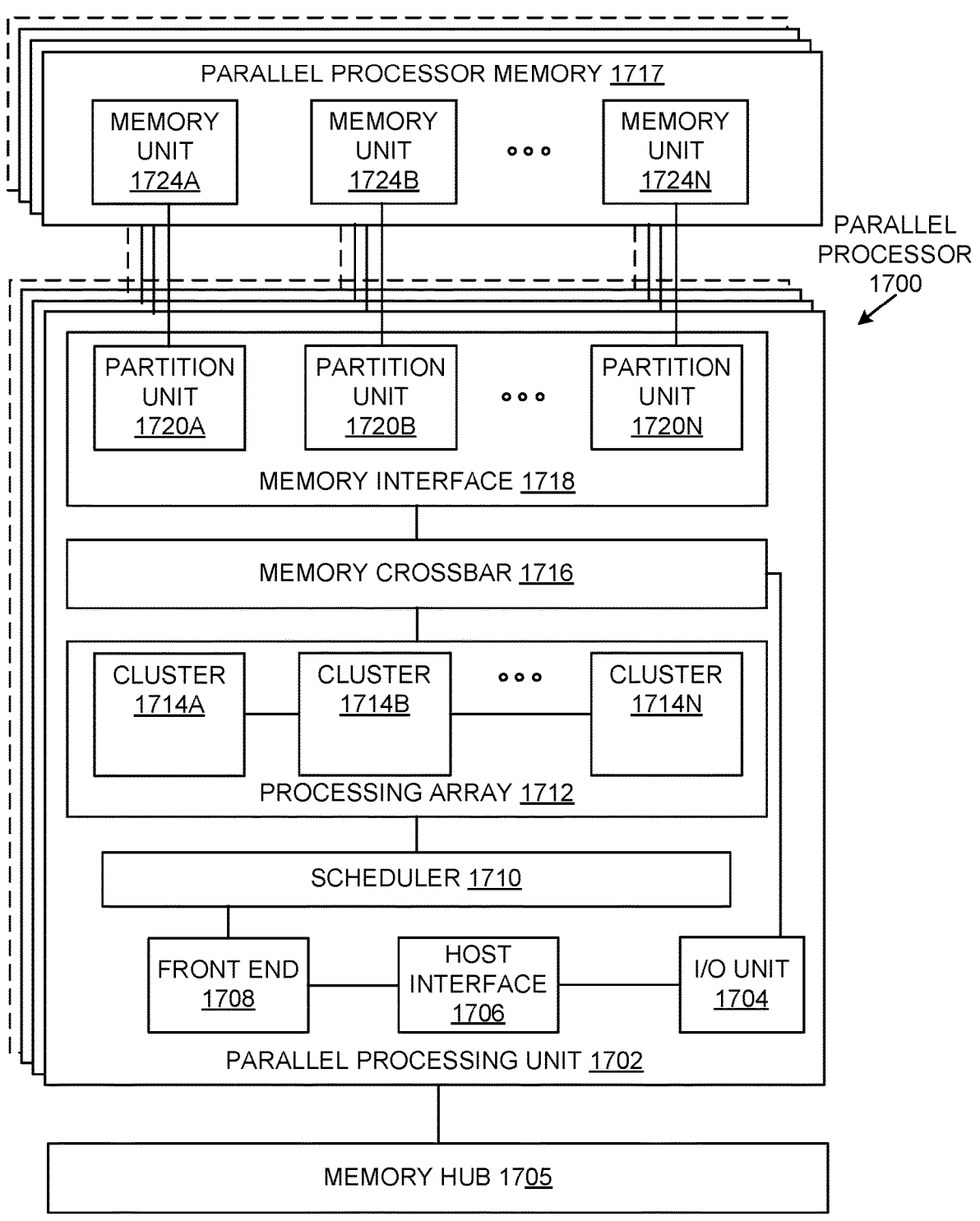
FIG. 17 illustrates a parallel processor, in at least one embodiment.

FIG. 17 illustrates a parallel processor 1700 according to at least on embodiment. In at least one embodiment, various components of parallel processor 1700 may be implemented using one or more integrated circuit devices, such as programmable processors, application specific integrated circuits (ASICs), or field programmable gate arrays (FPGA). In at least one embodiment, illustrated parallel processor 1700 is a variant of one or more parallel processor(s) 1612 shown in FIG. 16 according to an exemplary embodiment.

In at least one embodiment, parallel processor 1700 includes a parallel processing unit 1702. In at least one embodiment, parallel processing unit 1702 includes an I/O unit 1704 that enables communication with other devices, including other instances of parallel processing unit 1702. In at least one embodiment, I/O unit 1704 may be directly connected to other devices. In at least one embodiment, I/O unit 1704 connects with other devices via use of a hub or switch interface, such as memory hub 1705. In at least one embodiment, connections between memory hub 2105 and I/O unit 1704 form a communication link 2113. In at least one embodiment, I/O unit 1704 connects with a host interface 1706 and a memory crossbar 1716, where host interface 1706 receives commands directed to performing processing operations and memory crossbar 1716 receives commands directed to performing memory operations.

In at least one embodiment, when host interface 1706 receives a command buffer via I/O unit 1704, host interface 1706 can direct work operations to perform those commands to a front end 1708. In at least one embodiment, front end 1708 couples with a scheduler 1710, which is configured to distribute commands or other work items to a processing cluster array 1712. In at least one embodiment, scheduler 1710 ensures that processing cluster array 1712 is properly configured, and in a valid state, before tasks are distributed to processing cluster array 1712 of processing cluster array 1712. In at least one embodiment, scheduler 1710 is implemented via firmware logic executing on a microcontroller. In at least one embodiment, microcontroller implemented scheduler 1710 is configurable to perform complex scheduling and work distribution operations at coarse and fine granularity, enabling rapid preemption and context switching of threads executing on processing array 1712. In at least one embodiment, host software can prove workloads for scheduling on processing array 1712 via one of multiple graphics processing doorbells. In at least one embodiment, workloads can then be automatically distributed across processing array 1712 by scheduler 1710 logic within a microcontroller including scheduler 1710.

In at least one embodiment, processing cluster array 1712 can include up to "N" processing clusters (e.g., cluster 1714A, cluster 1714B, through cluster 1714N). In at least one embodiment, each cluster 1714A-1714N of processing cluster array 1712 can execute a large number of concurrent threads. In at least one embodiment, scheduler 1710 can allocate work to clusters 1714A-1714N of processing cluster array 1712 using various scheduling and/or work distribution algorithms, which may vary depending on workload arising for each type of program or computation. In at least one embodiment, scheduling can be handled dynamically by scheduler 1710, or can be assisted in part by compiler logic during compilation of program logic configured for execution by processing cluster array 1712. In at least one embodiment, different clusters 1714A-1714N of processing cluster array 1712 can be allocated for processing different types of programs or for performing different types of computations.

In at least one embodiment, processing cluster array 1712 can be configured to perform various types of parallel processing operations. In at least one embodiment, processing cluster array 1712 is configured to perform general-purpose parallel compute operations. For example, in at least one embodiment, processing cluster array 1712 can include logic to execute processing tasks including filtering of video and/or audio data, performing modeling operations, including physics operations, and performing data transformations.

In at least one embodiment, processing cluster array 1712 is configured to perform parallel graphics processing operations. In at least one embodiment, processing cluster array

1712 can include additional logic to support execution of such graphics processing operations, including, but not limited to texture sampling logic to perform texture operations, as well as tessellation logic and other vertex processing logic. In at least one embodiment, processing cluster array 1712 can be configured to execute graphics processing related shader programs such as, but not limited to vertex shaders, tessellation shaders, geometry shaders, and pixel shaders. In at least one embodiment, parallel processing unit 1702 can transfer data from system memory via I/O unit 1704 for processing. In at least one embodiment, during processing, transferred data can be stored to on-chip memory (e.g., parallel processor memory 1722) during processing, then written back to system memory.

In at least one embodiment, when parallel processing unit 1702 is used to perform graphics processing, scheduler 1710 can be configured to divide a processing workload into approximately equal sized tasks, to better enable distribution of graphics processing operations to multiple clusters 1714A-1714N of processing cluster array 1712. In at least one embodiment, portions of processing cluster array 1712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1714A-1714N may be stored in buffers to allow intermediate data to be transmitted between clusters 1714A-1714N for further processing.

In at least one embodiment, processing cluster array 1712 can receive processing tasks to be executed via scheduler 1710, which receives commands defining processing tasks from front end 1708. In at least one embodiment, processing tasks can include indices of data to be processed, such as may include surface (patch) data, primitive data, vertex data, and/or pixel data, as well as state parameters and commands defining how data is to be processed (e.g., what program is to be executed). In at least one embodiment, scheduler 1710 may be configured to fetch indices corresponding to tasks or may receive indices from front end 1708. In at least one embodiment, front end 1708 can be configured to ensure processing cluster array 1712 is configured to a valid state before a workload specified by incoming command buffers (e.g., batch-buffers, push buffers, etc.) is initiated.

In at least one embodiment, each of one or more instances of parallel processing unit 1702 can couple with parallel processor memory 1722. In at least one embodiment, parallel processor memory 1722 can be accessed via memory crossbar 1716, which can receive memory requests from processing cluster array 1712 as well as I/O unit 1704. In at least one embodiment, memory crossbar 1716 can access parallel processor memory 1722 via a memory interface 1718. In at least one embodiment, memory interface 1718 can include multiple partition units (e.g., partition unit 1720A, partition unit 1720B, through partition unit 1720N) that can each couple to a portion (e.g., memory unit) of parallel processor memory 1722. In at least one embodiment, a number of partition units 1720A-1720N is configured to be equal to a number of memory units, such that a first partition unit 1720A has a corresponding first memory unit 1724A, a second partition unit 1720B has a corresponding memory unit 1724B, and an Nth partition unit 1720N has a corresponding Nth memory unit 1724N. In at least one embodiment, a number of partition units 1720A-1720N may not be equal to a number of memory devices.

In at least one embodiment, memory units 1724A-1724N can include various types of memory devices, including dynamic random access memory (DRAM) or graphics random access memory, such as synchronous graphics random access memory (SGRAM), including graphics double data rate (GDDR) memory. In at least one embodiment, memory units 1724A-1724N may also include 3D stacked memory, including but not limited to high bandwidth memory (HBM). In at least one embodiment, render targets, such as frame buffers or texture maps may be stored across memory units 1724A-1724N, allowing partition units 1720A-1720N to write portions of each render target in parallel to efficiently use available bandwidth of parallel processor memory 1722. In at least one embodiment, a local instance of parallel processor memory 1722 may be excluded in favor of a unified memory design that utilizes system memory in conjunction with local cache memory.

In at least one embodiment, any one of clusters 1714A-1714N of processing cluster array 1712 can process data that will be written to any of memory units 1724A-1724N within parallel processor memory 1722. In at least one embodiment, memory crossbar 1716 can be configured to transfer an output of each cluster 1714A-1714N to any partition unit 1720A-1720N or to another cluster 1714A-1714N, which can perform additional processing operations on an output. In at least one embodiment, each cluster 1714A-1714N can communicate with memory interface 1718 through memory crossbar 1716 to read from or write to various external memory devices. In at least one embodiment, memory crossbar 1716 has a connection to memory interface 1718 to communicate with I/O unit 1704, as well as a connection to a local instance of parallel processor memory 1722, enabling processing units within different processing clusters 1714A-1714N to communicate with system memory or other memory that is not local to parallel processing unit 1702. In at least one embodiment, memory crossbar 1716 can use virtual channels to separate traffic streams between clusters 1714A-1714N and partition units 1720A-1720N.

In at least one embodiment, multiple instances of parallel processing unit 1702 can be provided on a single add-in card, or multiple add-in cards can be interconnected. In at least one embodiment, different instances of parallel processing unit 1702 can be configured to inter-operate even if different instances have different numbers of processing cores, different amounts of local parallel processor memory, and/or other configuration differences. For example, in at least one embodiment, some instances of parallel processing unit 1702 can include higher precision floating point units relative to other instances. In at least one embodiment, systems incorporating one or more instances of parallel processing unit 1702 or parallel processor 1700 can be implemented in a variety of configurations and form factors, including but not limited to desktop, laptop, or handheld personal computers, servers, workstations, game consoles, and/or embedded systems.

Figure 18:
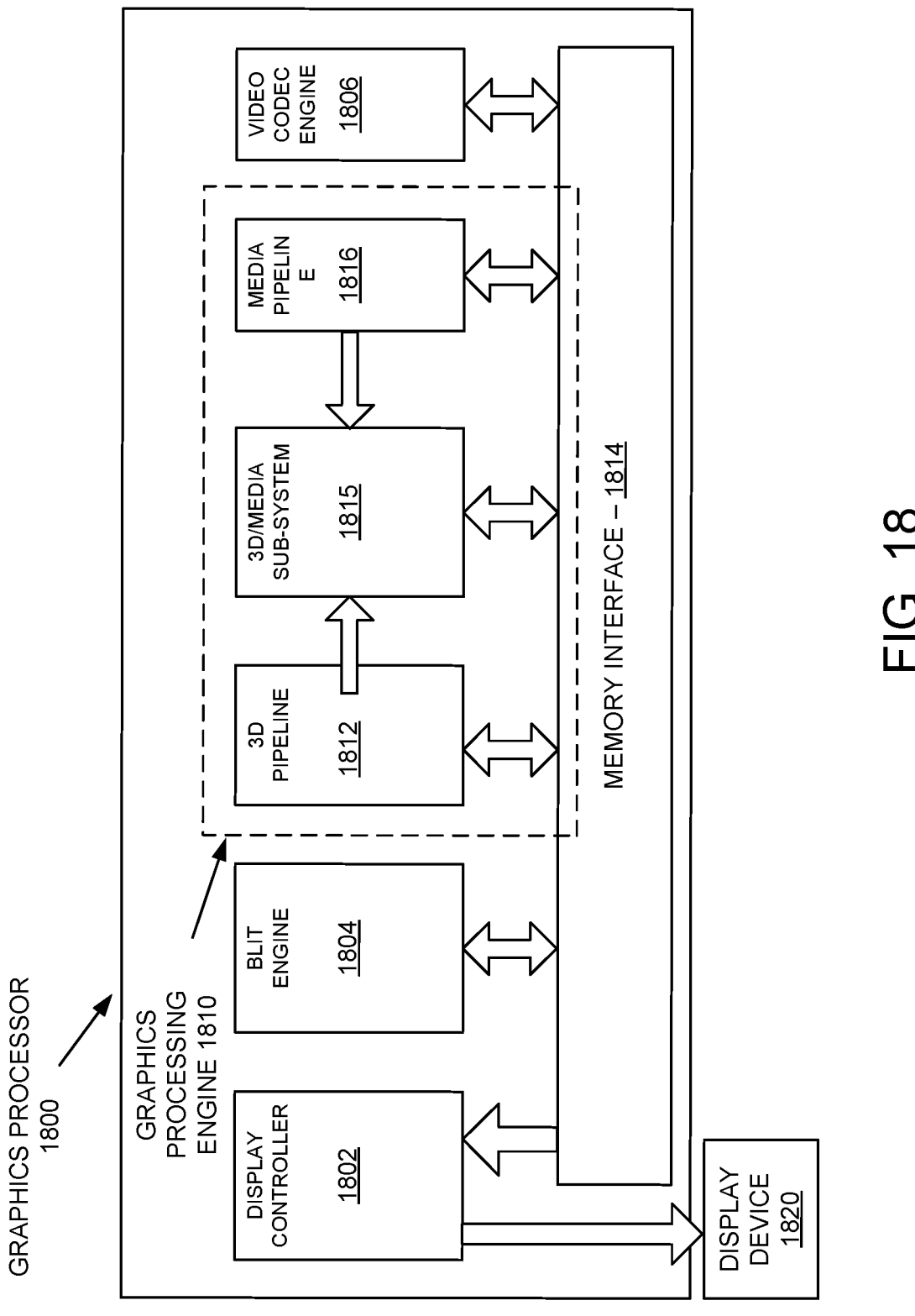
FIG. 18 illustrates at least portions of a graphics processor, in at least one embodiment.

FIG. 18 is a block diagram of a graphics processor 1800, which may be a discrete graphics processing unit, or may be a graphics processor integrated with a plurality of processing cores. In at least one embodiment, graphics processor 1800 communicates via a memory mapped I/O interface to registers on graphics processor 1800 and with commands placed into memory. In at least one embodiment, graphics processor 1800 includes a memory interface 1814 to access memory. In at least one embodiment, memory interface 1814 is an interface to local memory, one or more internal caches, one or more shared external caches, and/or to system memory.

In at least one embodiment, graphics processor 1800 also includes a display controller 1802 to drive display output data to a display device 1820. In at least one embodiment, display controller 1802 includes hardware for one or more overlay planes for display device 1820 and composition of multiple layers of video or user interface elements. In at least one embodiment, display device 1820 can be an internal or external display device. In at least one embodiment, display device 1820 is a head mounted display device, such as a virtual reality (VR) display device or an augmented reality (AR) display device. In at least one embodiment, graphics processor 1800 includes a video codec engine 1806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 1800 includes a block image transfer (BLIT) engine 1804 to perform two-dimensional (2D) rasterizer operations including, for example, bit-boundary block transfers. However, in at least one embodiment, 2D graphics operations are performed using one or more components of graphics processing engine (GPE) 1810. In at least one embodiment, GPE 1810 is a compute engine for performing graphics operations, including three-dimensional (3D) graphics operations and media operations.

In at least one embodiment, GPE 1810 includes a 3D pipeline 1812 for performing 3D operations, such as rendering three-dimensional images and scenes using processing functions that act upon 3D primitive shapes (e.g., rectangle, triangle, etc.). 3D pipeline 1812 includes programmable and fixed function elements that perform various tasks and/or spawn execution threads to a 3D/Media subsystem 1815. While 3D pipeline 1812 can be used to perform media operations, in at least one embodiment, GPE 1810 also includes a media pipeline 1816 that is used to perform media operations, such as video post-processing and image enhancement.

In at least one embodiment, media pipeline 1816 includes fixed function or programmable logic units to perform one or more specialized media operations, such as video decode acceleration, video de-interlacing, and video encode acceleration in place of, or on behalf of video codec engine 1806. In at least one embodiment, media pipeline 1816 additionally includes a thread spawning unit to spawn threads for execution on 3D/Media sub-system 1815. In at least one embodiment, spawned threads perform computations for media operations on one or more graphics execution units included in 3D/Media sub-system 1815.

In at least one embodiment, 3D/Media subsystem 1815 includes logic for executing threads spawned by 3D pipeline 1812 and media pipeline 1816. In at least one embodiment, 3D pipeline 1812 and media pipeline 1816 send thread execution requests to 3D/Media subsystem 1815, which includes thread dispatch logic for arbitrating and dispatching various requests to available thread execution resources. In at least one embodiment, execution resources include an array of graphics execution units to process 3D and media threads. In at least one embodiment, 3D/Media subsystem 1815 includes one or more internal caches for thread instructions and data. In at least one embodiment, subsystem 1815 also includes shared memory, including registers and addressable memory, to share data between threads and to store output data.

Figure 19A:
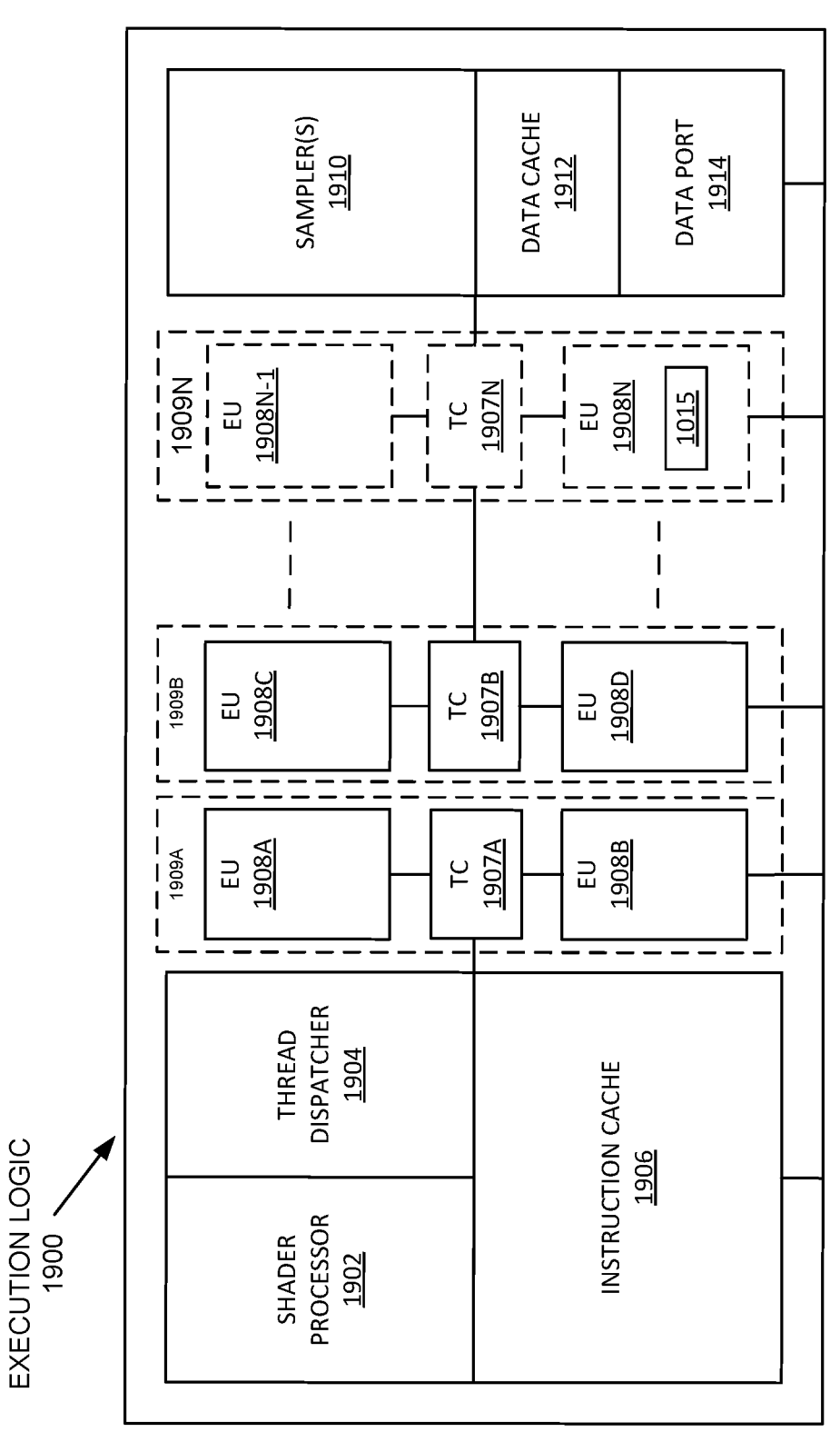
FIGS. 19A and 19B illustrates thread execution logic, in at least one embodiment.
Figure 19B:
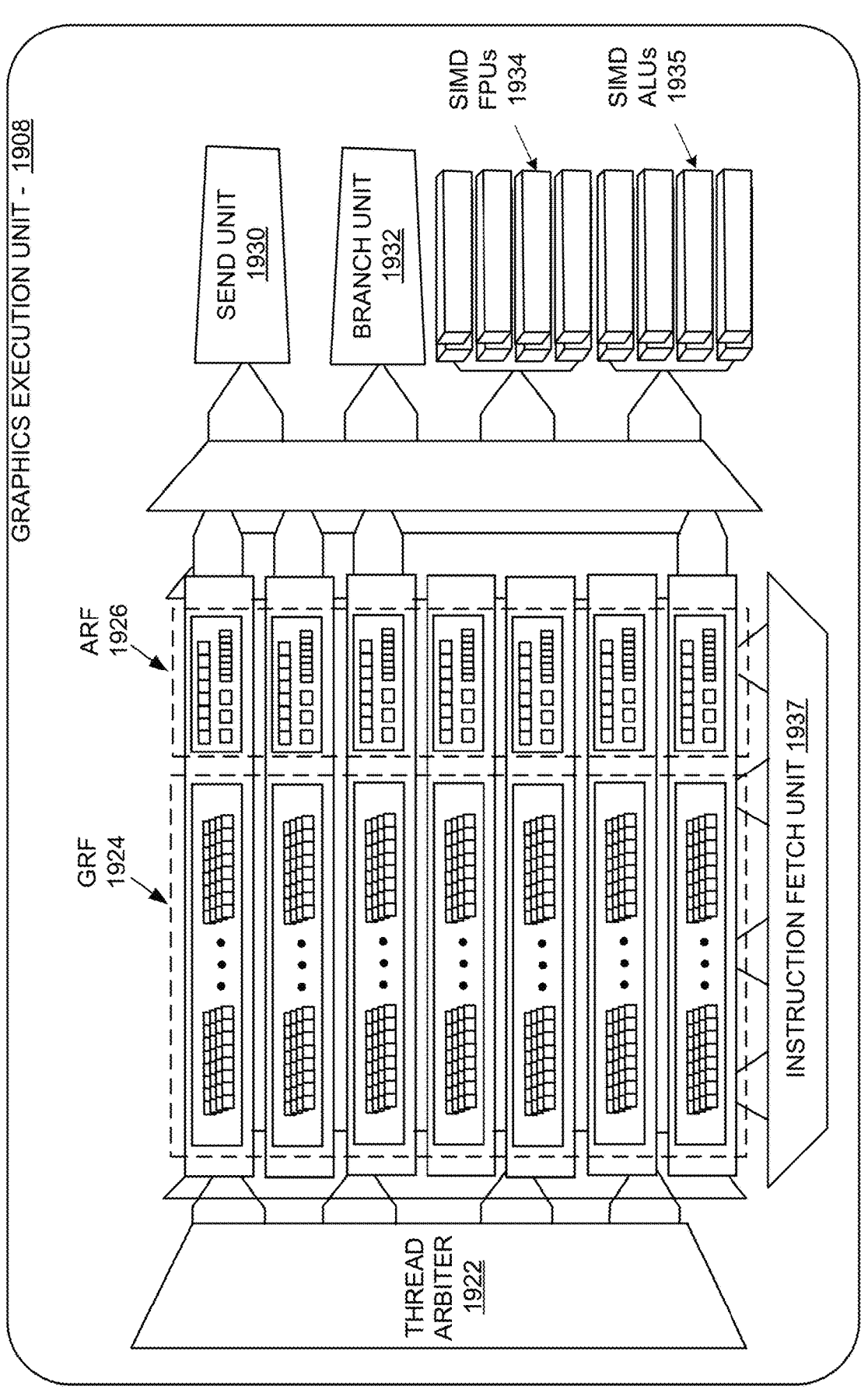

FIGS. 19A-19B illustrate thread execution logic 1900 including an array of processing elements of a graphics processor core in at least one embodiment. FIG. 19A illustrates at least one embodiment, in which thread execution logic 1900 is used. FIG. 19B illustrates exemplary internal details of an execution unit, in at least one embodiment.

As illustrated in FIG. 19A, in at least one embodiment, thread execution logic 1900 includes a shader processor 1902, a thread dispatcher 1904, instruction cache 1906, a scalable execution unit array including a plurality of execution units 1908A-1908N, a sampler 1910, a data cache 1912, and a data port 1914. In at least one embodiment a scalable execution unit array can dynamically scale by enabling or disabling one or more execution units (e.g., any of execution unit 1908A, 1908B, 1908C, 1908D, through 1908N-1 and 1908N) based on computational requirements of a workload, for example. In at least one embodiment, scalable execution units are interconnected via an interconnect fabric that links to each execution unit. In at least one embodiment, thread execution logic 1900 includes one or more connections to memory, such as system memory or cache memory, through one or more of instruction cache 1906, data port 1914, sampler 1910, and execution units 1908A-1908N. In at least one embodiment, each execution unit (e.g., 1908A) is a stand-alone programmable general-purpose computational unit that is capable of executing multiple simultaneous hardware threads while processing multiple data elements in parallel for each thread. In at least one embodiment, array of execution units 1908A-1908N is scalable to include any number individual execution units.

In at least one embodiment, execution units 1908A-1908N are primarily used to execute shader programs. In at least one embodiment, shader processor 1902 can process various shader programs and dispatch execution threads associated with shader programs via a thread dispatcher 1904. In at least one embodiment, thread dispatcher 1904 includes logic to arbitrate thread initiation requests from graphics and media pipelines and instantiate requested threads on one or more execution units in execution units 1908A-1908N. For example, in at least one embodiment, a geometry pipeline can dispatch vertex, tessellation, or geometry shaders to thread execution logic for processing. In at least one embodiment, thread dispatcher 1904 can also process runtime thread spawning requests from executing shader programs.

In at least one embodiment, execution units 1908A-1908N support an instruction set that includes native support for many standard 3D graphics shader instructions, such that shader programs from graphics libraries (e.g., Direct 3D and OpenGL) are executed with minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 1908A-1908N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one or more shared functions, dependency logic within execution units 1908A-1908N causes a waiting thread to sleep until requested data has been returned. In at least one embodiment, hardware resources may be devoted to processing other threads while a specific, waiting thread is sleeping. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 1908A-1908N operates on arrays of data elements. In at least one embodiment, the number of data elements is "execution size," or the number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 1908A-1908N support integer and floating-point data types.

In at least one embodiment, an execution unit instruction set includes SIMD instructions. In at least one embodiment, various data elements can be stored as a packed data type in a register and an execution unit will process various elements based on the data size of those elements. For example, in at least one embodiment, when operating on a 256-bit wide vector, 256 bits of a vector are stored in a register and an execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 1909A-1909N having thread control logic (1907A-1907N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary in at least one embodiment. In at least one embodiment, various SIMD widths can be performed per-EU, including but not limited to SIMD8, SIMD16, and SIMD32. In at least one embodiment, each fused graphics execution unit 1909A-1909N includes at least two execution units. For example, in at least one embodiment, fused execution unit 1909A includes a first EU 1908A, second EU 1908B, and thread control logic 1907A that is common to first EU 1908A and second EU 1908B. In at least one embodiment, thread control logic 1907A controls threads executed on fused graphics execution unit 1909A, allowing each EU within fused execution units 1909A-1909N to execute using a common instruction pointer register.

In at least one embodiment, one or more internal instruction caches (e.g., 1906) are included in thread execution logic 1900 to cache thread instructions for execution units. In at least one embodiment, one or more data caches (e.g., 1912) are included to cache thread data during thread execution. In at least one embodiment, a sampler 1910 is included to provide texture sampling for 3D operations and media sampling for media operations. In at least one embodiment, sampler 1910 includes specialized texture or media sampling functionality to process texture or media data during the sampling process before providing sampled data to an execution unit.

During execution, in at least one embodiment, graphics and media pipelines send thread initiation requests to thread execution logic 1900 via thread spawning and dispatch logic. In at least one embodiment, once a group of geometric objects has been processed and rasterized into pixel data, pixel processor logic (e.g., pixel shader logic, fragment shader logic, etc.) within shader processor 1902 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 1902 then executes an application programming interface (API)-supplied pixel or fragment shader program. In at least one embodiment, to execute a shader program, shader processor 1902 dispatches threads to an execution unit (e.g., 1908A) via thread dispatcher 1904. In at least one embodiment, shader processor 1902 uses texture sampling logic in sampler 1910 to access texture data in texture maps stored in memory. In at least one embodiment, arithmetic operations on texture data and input geometry data compute pixel color data for each geometric fragment, or discards one or more pixels from further processing.

In at least one embodiment, data port 1914 provides a memory access mechanism for thread execution logic 1900 to output processed data to memory for further processing on a graphics processor output pipeline. In at least one embodiment, data port 1914 includes or couples to one or more cache memories (e.g., data cache 1912) to cache data for memory access via a data port.

As illustrated in FIG. 19B, in at least one embodiment, a graphics execution unit 1908 can include an instruction fetch unit 1937, a general register file array (GRF) 1924, an architectural register file array (ARF) 1926, a thread arbiter 1922, a send unit 1930, a branch unit 1932, a set of SIMD floating point units (FPUs) 1934, and In at least one embodiment a set of dedicated integer SIMD ALUs 1935. In at least one embodiment, GRF 1924 and ARF 1926 includes a set of general register files and architecture register files associated with each simultaneous hardware thread that may be active in graphics execution unit 1908. In at least one embodiment, per thread architectural state is maintained in ARF 1926, while data used during thread execution is stored in GRF 1924. In at least one embodiment, execution state of each thread, including instruction pointers for each thread, can be held in thread-specific registers in ARF 1926.

In at least one embodiment, graphics execution unit 1908 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 1908 can co-issue multiple instructions, which may each be different instructions. In at least one embodiment, thread arbiter 1922 of graphics execution unit thread 1908 can dispatch instructions to one of send unit 1930, branch unit 1942, or SIMD FPU(s) 1934 for execution. In at least one embodiment, each execution thread can access 128 general-purpose registers within GRF 1924, where each register can store 32 bytes, accessible as a SIMD 8-element vector of 32-bit data elements. In at least one embodiment, each execution unit thread has access to 4 Kbytes within GRF 1924, although embodiments are not so limited, and greater or fewer register resources may be provided in other embodiments. In at least one embodiment, up to seven threads can execute simultaneously, although the number of threads per execution unit can also vary according to embodiments. In at least one embodiment, in which seven threads may access 4 Kbytes, GRF 1924 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 1930. In at least one embodiment, branch instructions are dispatched to a dedicated branch unit 1932 to facilitate SIMD divergence and eventual convergence.

In at least one embodiment graphics execution unit 1908 includes one or more SIMD floating point units (FPU(s)) 1934 to perform floating-point operations. In at least one embodiment, FPU(s) 1934 also support integer computation. In at least one embodiment FPU(s) 1934 can SIMD execute up to M number of 32-bit floating-point (or integer) operations, or SIMD execute up to 2M 16-bit integer or 16-bit floating-point operations. In at least one embodiment, at least one of the FPU(s) provides extended math capability to support high-throughput transcendental math functions and double precision 64-bit floating-point. In at least one embodiment, a set of 8-bit integer SIMD ALUs 1935 are also present, and may be specifically optimized to perform operations associated with machine learning computations.

In at least one embodiment, arrays of multiple instances of graphics execution unit 1908 can be instantiated in a graphics sub-core grouping (e.g., a sub-slice). In at least one embodiment execution unit 1908 can execute instructions across a plurality of execution channels. In at least one embodiment, each thread executed on graphics execution unit 1908 is executed on a different channel.

Figure 20:
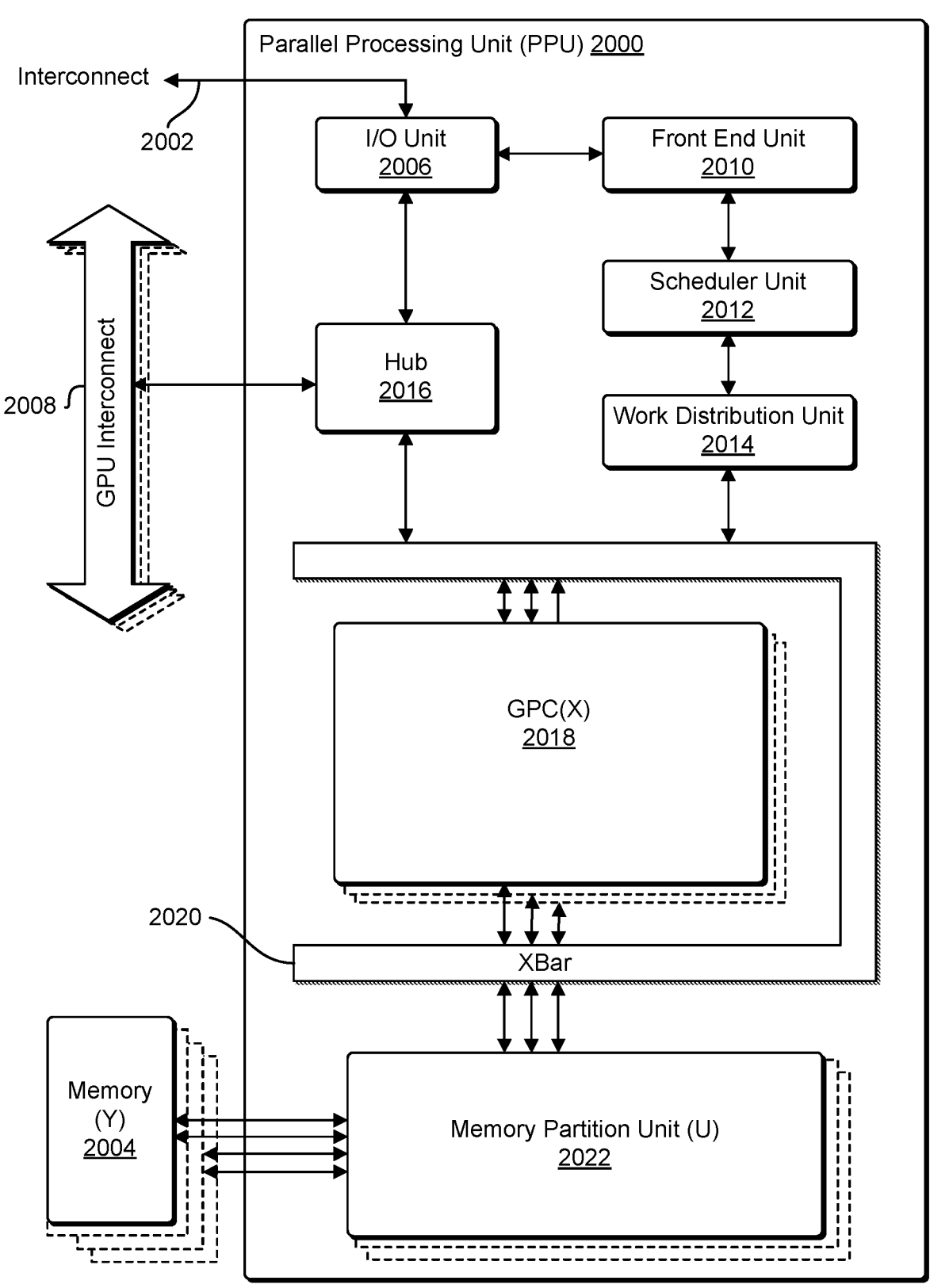
FIG. 20 illustrates a parallel processing unit ("PPU"), in at least one embodiment.

FIG. 20 illustrates a parallel processing unit ("PPU") 2000, in at least one embodiment. In at least one embodiment, PPU 2000 is configured with machine-readable code that, if executed by PPU 2000, causes PPU 2000 to perform some or all of processes and techniques described throughout this disclosure. In at least one embodiment, PPU 2000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2000. In at least one embodiment, PPU 2000 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 2000 is utilized to perform computations such as linear algebra operations and machine-learning operations. FIG. 20 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 2000 are configured to accelerate High Performance Computing ("HPC"), data center, and machine learning applications. In at least one embodiment, PPU 2000 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 2000 includes, without limitation, an Input/Output ("I/O") unit 2006, a front-end unit 2010, a scheduler unit 2012, a work distribution unit 2014, a hub 2016, a crossbar ("Xbar") 2020, one or more general processing clusters ("GPCs") 2018, and one or more partition units ("memory partition units") 2022. In at least one embodiment, PPU 2000 is connected to a host processor or other PPUs 2000 via one or more high-speed GPU interconnects ("GPU interconnects") 2008. In at least one embodiment, PPU 2000 is connected to a host processor or other peripheral devices via an interconnect 2002. In at least one embodiment, PPU 2000 is connected to a local memory comprising one or more memory devices ("memory") 2004. In at least one embodiment, memory devices 2004 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2008 may refer to a wire-based multi-lane communications link that is used by systems to scale and include one or more PPUs 2000 combined with one or more central processing units ("CPUs"), supports cache coherence between PPUs 2000 and CPUs, and CPU mastering. In at least one embodiment, data and/or commands are transmitted by high-speed GPU interconnect 2008 through hub 2016 to/from other units of PPU 2000 such as one or more copy engines, video encoders, video decoders, power management units, and other components which may not be explicitly illustrated in FIG. 20.

In at least one embodiment, I/O unit 2006 is configured to transmit and receive communications (e.g., commands, data) from a host processor (not illustrated in FIG. 20) over system bus 2002. In at least one embodiment, I/O unit 2006 communicates with host processor directly via system bus 2002 or through one or more intermediate devices such as a memory bridge. In at least one embodiment, I/O unit 2006 may communicate with one or more other processors, such as one or more of PPUs 2000 via system bus 2002. In at least one embodiment, I/O unit 2006 implements a Peripheral Component Interconnect Express ("PCIe") interface for communications over a PCIe bus. In at least one embodiment, I/O unit 2006 implements interfaces for communicating with external devices.

In at least one embodiment, I/O unit 2006 decodes packets received via system bus 2002. In at least one embodiment, at least some packets represent commands configured to cause PPU 2000 to perform various operations. In at least one embodiment, I/O unit 2006 transmits decoded commands to various other units of PPU 2000 as specified by commands. In at least one embodiment, commands are transmitted to front-end unit 2010 and/or transmitted to hub 2016 or other units of PPU 2000 such as one or more copy engines, a video encoder, a video decoder, a power management unit, etc. (not explicitly illustrated in FIG. 20). In at least one embodiment, I/O unit 2006 is configured to route communications between and among various logical units of PPU 2000.

In at least one embodiment, a program executed by host processor encodes a command stream in a buffer that provides workloads to PPU 2000 for processing. In at least one embodiment, a workload comprises instructions and data to be processed by those instructions. In at least one embodiment, the buffer is a region in a memory that is accessible (e.g., read/write) by both host processor and PPU 2000. A host interface unit may be configured to access buffer in a system memory connected to system bus 2002 via memory requests transmitted over system bus 2002 by I/O unit 2006. In at least one embodiment, host processor writes command stream to buffer and then transmits a pointer to start of command stream to PPU 2000 such that front-end unit 2010 receives pointers to one or more command streams and manages one or more command streams, reading commands from command streams and forwarding commands to various units of PPU 2000.

In at least one embodiment, front-end unit 2010 is coupled to scheduler unit 2012 that configures various GPCs 2018 to process tasks defined by one or more command streams. In at least one embodiment, scheduler unit 2012 is configured to track state information related to various tasks managed by scheduler unit 2012 where state information may indicate which of GPCs 2018 a task is assigned to, whether task is active or inactive, a priority level associated with task, and so forth. In at least one embodiment, scheduler unit 2012 manages execution of a plurality of tasks on one or more of GPCs 2018.

In at least one embodiment, scheduler unit 2012 is coupled to work distribution unit 2014 that is configured to dispatch tasks for execution on GPCs 2018. In at least one embodiment, work distribution unit 2014 tracks a number of scheduled tasks received from scheduler unit 2012 and work distribution unit 2014 manages a pending task pool and an active task pool for each of GPCs 2018. In at least one embodiment, pending task pool comprises a number of slots (e.g., 20 slots) that contain tasks assigned to be processed by a particular GPC 2018; active task pool may comprise a number of slots (e.g., 4 slots) for tasks that are actively being processed by GPCs 2018 such that as one of GPCs 2018 completes execution of a task, that task is evicted from active task pool for GPC 2018 and one of other tasks from pending task pool is selected and scheduled for execution on GPC 2018. In at least one embodiment, if an active task is idle on GPC 2018, such as while waiting for a data dependency to be resolved, then active task is evicted from GPC 2018 and returned to pending task pool while another task in pending task pool is selected and scheduled for execution on GPC 2018.

In at least one embodiment, work distribution unit 2014 communicates with one or more GPCs 2018 via XBar 2020. In at least one embodiment, XBar 2020 is an interconnect network that couples many of units of PPU 2000 to other units of PPU 2000 and can be configured to couple work distribution unit 2014 to a particular GPC 2018. In at least one embodiment, one or more other units of PPU 2000 may also be connected to XBar 2020 via hub 2016.

In at least one embodiment, tasks are managed by scheduler unit 2012 and dispatched to one of GPCs 2018 by work distribution unit 2014. GPC 2018 is configured to process task and generate results. In at least one embodiment, results may be consumed by other tasks within GPC 2018, routed to a different GPC 2018 via XBar 2020, or stored in memory 2004. In at least one embodiment, results can be written to memory 2004 via partition units 2022, which implement a memory interface for reading and writing data to/from memory 2004. In at least one embodiment, results can be transmitted to another PPU 2004 or CPU via high-speed GPU interconnect 2008. In at least one embodiment, PPU 2000 includes, without limitation, a number U of partition units 2022 that is equal to number of separate and distinct memory devices 2004 coupled to PPU 2000. In at least one embodiment, partition unit 2022 will be described in more detail below in conjunction with FIG. 22.

In at least one embodiment, a host processor executes a driver kernel that implements an application programming interface ("API") that enables one or more applications executing on host processor to schedule operations for execution on PPU 2000. In at least one embodiment, multiple compute applications are simultaneously executed by PPU 2000 and PPU 2000 provides isolation, quality of service ("QoS"), and independent address spaces for multiple compute applications. In at least one embodiment, an application generates instructions (e.g., in form of API calls) that cause driver kernel to generate one or more tasks for execution by PPU 2000 and driver kernel outputs tasks to one or more streams being processed by PPU 2000. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 22.

Figure 21:
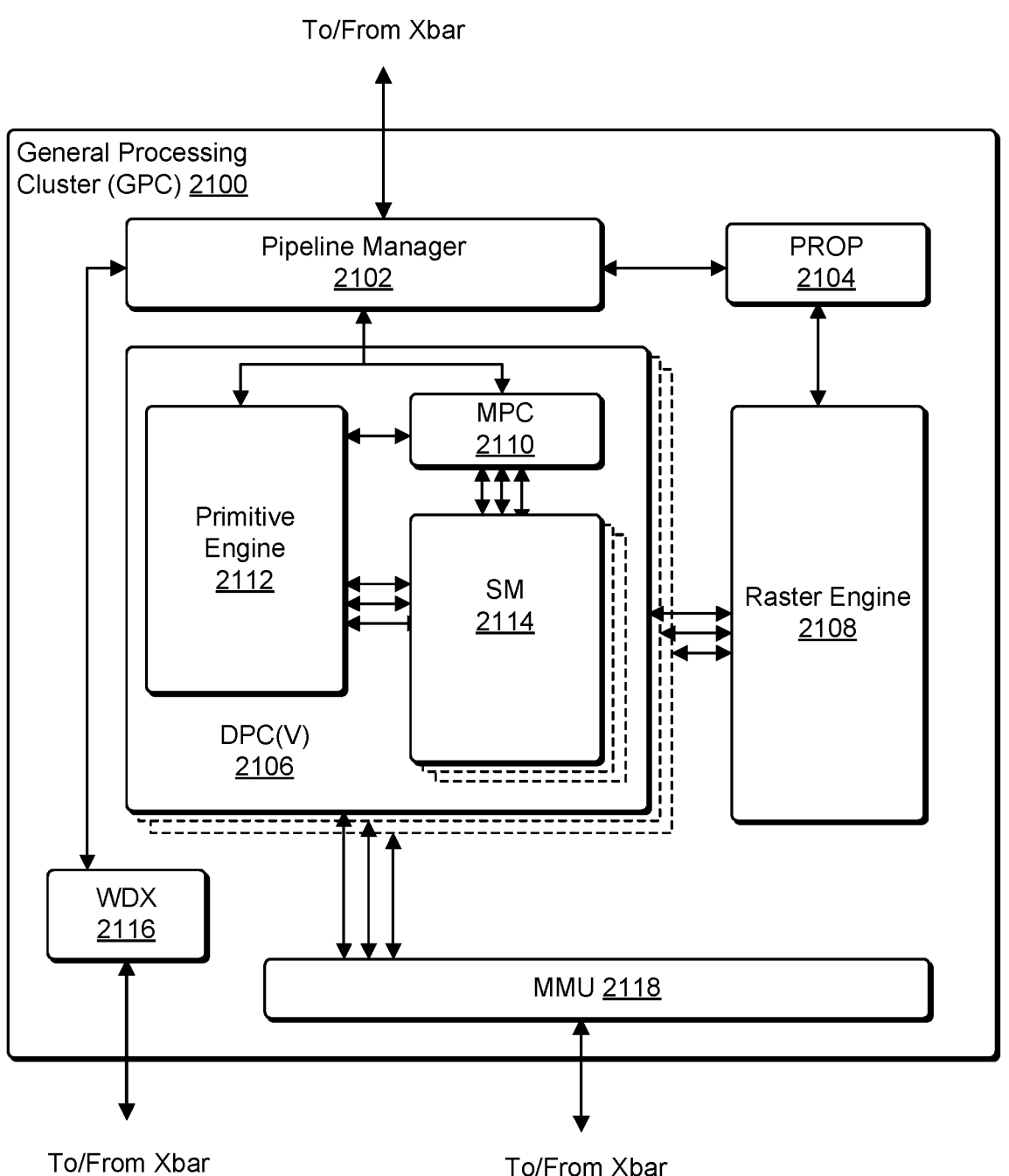
FIG. 21 illustrates a general processing cluster ("GPC"), in at least one embodiment.

FIG. 21 illustrates a general processing cluster ("GPC") 2100, in at least one embodiment. In at least one embodiment, GPC 2100 is GPC 2018 of FIG. 20. In at least one embodiment, each GPC 2100 includes, without limitation, a number of hardware units for processing tasks and each GPC 2100 includes, without limitation, a pipeline manager 2102, a pre-raster operations unit ("PROP") 2104, a raster engine 2108, a work distribution crossbar ("WDX") 2116, a memory management unit ("MMU") 2118, one or more Data Processing Clusters ("DPCs") 2106, and any suitable combination of parts.

In at least one embodiment, operation of GPC 2100 is controlled by pipeline manager 2102. In at least one embodiment, pipeline manager 2102 manages configuration of one or more DPCs 2106 for processing tasks allocated to GPC 2100. In at least one embodiment, pipeline manager 2102 configures at least one of one or more DPCs 2106 to implement at least a portion of a graphics rendering pipeline. In at least one embodiment, DPC 2106 is configured to execute a vertex shader program on a programmable streaming multi-processor ("SM") 2114. In at least one embodiment, pipeline manager 2102 is configured to route packets received from a work distribution unit to appropriate logical units within GPC 2100, in at least one embodiment, and some packets may be routed to fixed function hardware units in PROP 2104 and/or raster engine 2108 while other packets may be routed to DPCs 2106 for processing by a primitive engine 2112 or SM 2114. In at least one embodiment, pipeline manager 2102 configures at least one of DPCs 2106 to implement a neural network model and/or a computing pipeline.

In at least one embodiment, PROP unit 2104 is configured, in at least one embodiment, to route data generated by raster engine 2108 and DPCs 2106 to a Raster Operations ("ROP") unit in partition unit 2022, described in more detail above in conjunction with FIG. 20. In at least one embodiment, PROP unit 2104 is configured to perform optimizations for color blending, organize pixel data, perform address translations, and more. In at least one embodiment, raster engine 2108 includes, without limitation, a number of fixed function hardware units configured to perform various raster operations, in at least one embodiment, and raster engine 2108 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 2108 comprises fragments to be processed by any suitable entity such as by a fragment shader implemented within DPC 2106.

In at least one embodiment, each DPC 2106 included in GPC 2100 comprise, without limitation, an M-Pipe Controller ("MPC") 2110; primitive engine 2112; one or more SMs 2114; and any suitable combination thereof. In at least one embodiment, MPC 2110 controls operation of DPC 2106, routing packets received from pipeline manager 2102 to appropriate units in DPC 2106. In at least one embodiment, packets associated with a vertex are routed to primitive engine 2112, which is configured to fetch vertex attributes associated with vertex from memory; in contrast, packets associated with a shader program may be transmitted to SM 2114.

In at least one embodiment, SM 2114 comprises, without limitation, a programmable streaming processor that is configured to process tasks represented by a number of threads. In at least one embodiment, SM 2114 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 2114 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state are maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 2114 is described in more detail below.

In at least one embodiment, MMU 2118 provides an interface between GPC 2100 and memory partition unit (e.g., partition unit 2022 of FIG. 20) and MMU 2118 provides translation of virtual addresses into physical addresses, memory protection, and arbitration of memory requests. In at least one embodiment, MMU 2118 provides one or more translation lookaside buffers ("TLBs") for performing translation of virtual addresses into physical addresses in memory.

Figure 22:
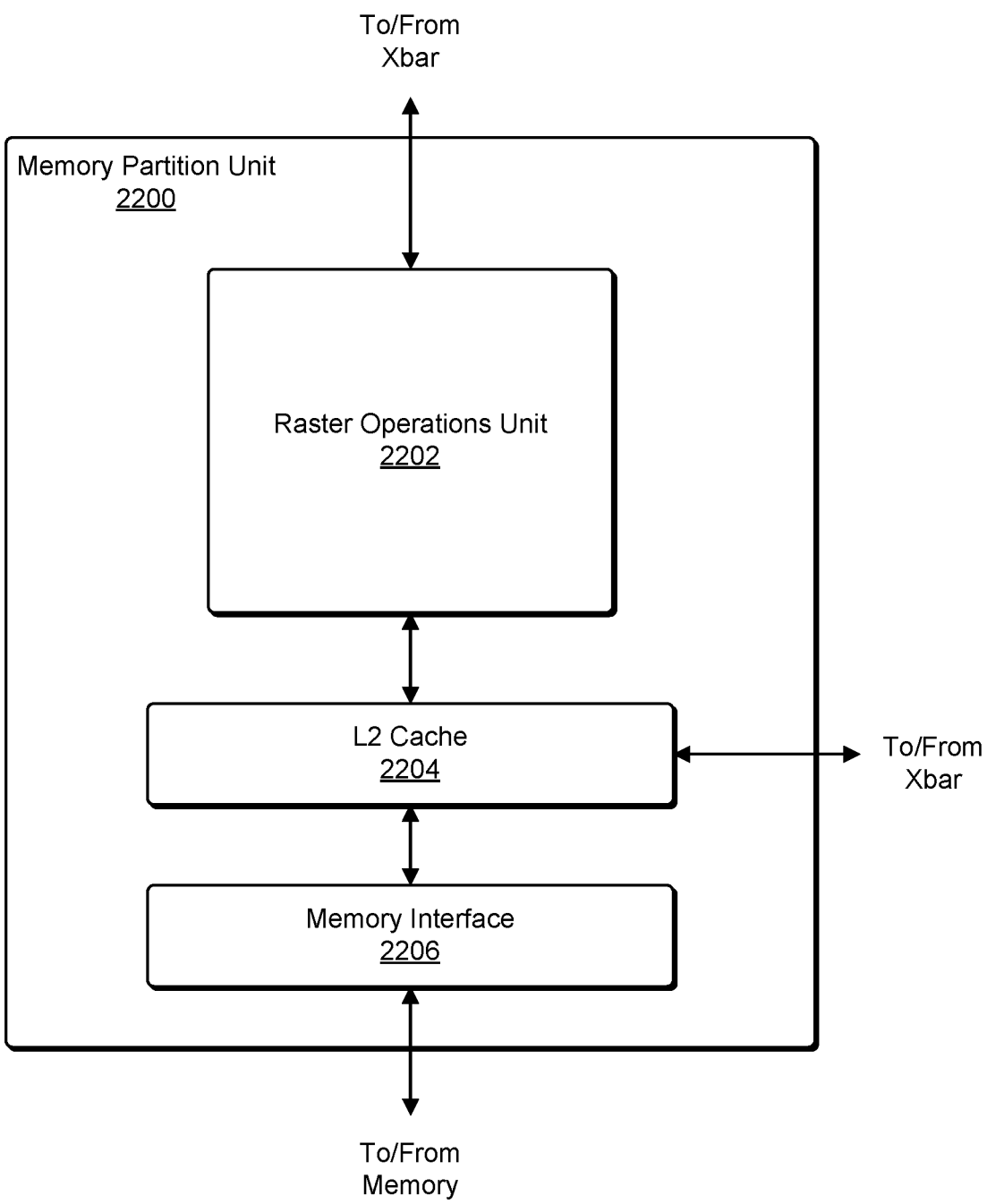
FIG. 22 illustrates a memory partition unit of a parallel processing unit ("PPU"), in at least one embodiment.

FIG. 22 illustrates a memory partition unit 2200 of a parallel processing unit ("PPU"), in accordance with at least one embodiment. In at least one embodiment, memory partition unit 2200 includes, without limitation, a Raster Operations ("ROP") unit 2202; a level two ("L2") cache 2204; a memory interface 2206; and any suitable combination thereof. Memory interface 2206 is coupled to memory. Memory interface 2206 may implement 32, 64, 128, 1024-bit data buses, or like, for high-speed data transfer. In at least one embodiment, PPU incorporates U memory interfaces 2206, one memory interface 2206 per pair of partition units 2200, where each pair of partition units 2200 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 2206 implements a high bandwidth memory second generation ("HBM2") memory interface and Y equals half U. In at least one embodiment, HBM2 memory stacks are located on same physical package as PPU, providing substantial power and area savings compared with GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 2200 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3208 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 2200 then services page faults, mapping addresses into page table, after which copy engine performs transfer. In at least one embodiment, memory is pinned (such as non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3204 of FIG. 32 or other system memory is fetched by memory partition unit 2200 and stored in L2 cache 2204, which is located on-chip and is shared between various GPCs, in accordance with at least one embodiment. Each memory partition unit 2200, in at least one embodiment, includes, without limitation, at least a portion of L2 cache associated with a corresponding memory device. In at least one embodiment, lower level caches are implemented in various units within GPCs. In at least one embodiment, each of SMs 2114 may implement a level one ("L1") cache wherein L1 cache is private memory that is dedicated to a particular SM 2114 and data from L2 cache 2204 is fetched and stored in each of L1 caches for processing in functional units of SMs 2114. In at least one embodiment, L2 cache 2204 is coupled to memory interface 2206 and XBar 3220.

ROP unit 2202 performs graphics raster operations related to pixel color, such as color compression, pixel blending, and more, in at least one embodiment. ROP unit 2202, in at least one embodiment, implements depth testing in conjunction with raster engine 2108, receiving a depth for a sample location associated with a pixel fragment from culling engine of raster engine 2108. In at least one embodiment, depth is tested against a corresponding depth in a depth buffer for a sample location associated with fragment. In at least one embodiment, if fragment passes depth test for sample location, then ROP unit 2202 updates depth buffer and transmits a result of depth test to raster engine 2108. It will be appreciated that number of partition units 2200 may be different than number of GPCs and, therefore, each ROP unit 2202 can, in at least one embodiment, be coupled to each of GPCs. In at least one embodiment, ROP unit 2202 tracks packets received from different GPCs and determines which that a result generated by ROP unit 2202 is routed to through XBar 3220.

Figure 23:
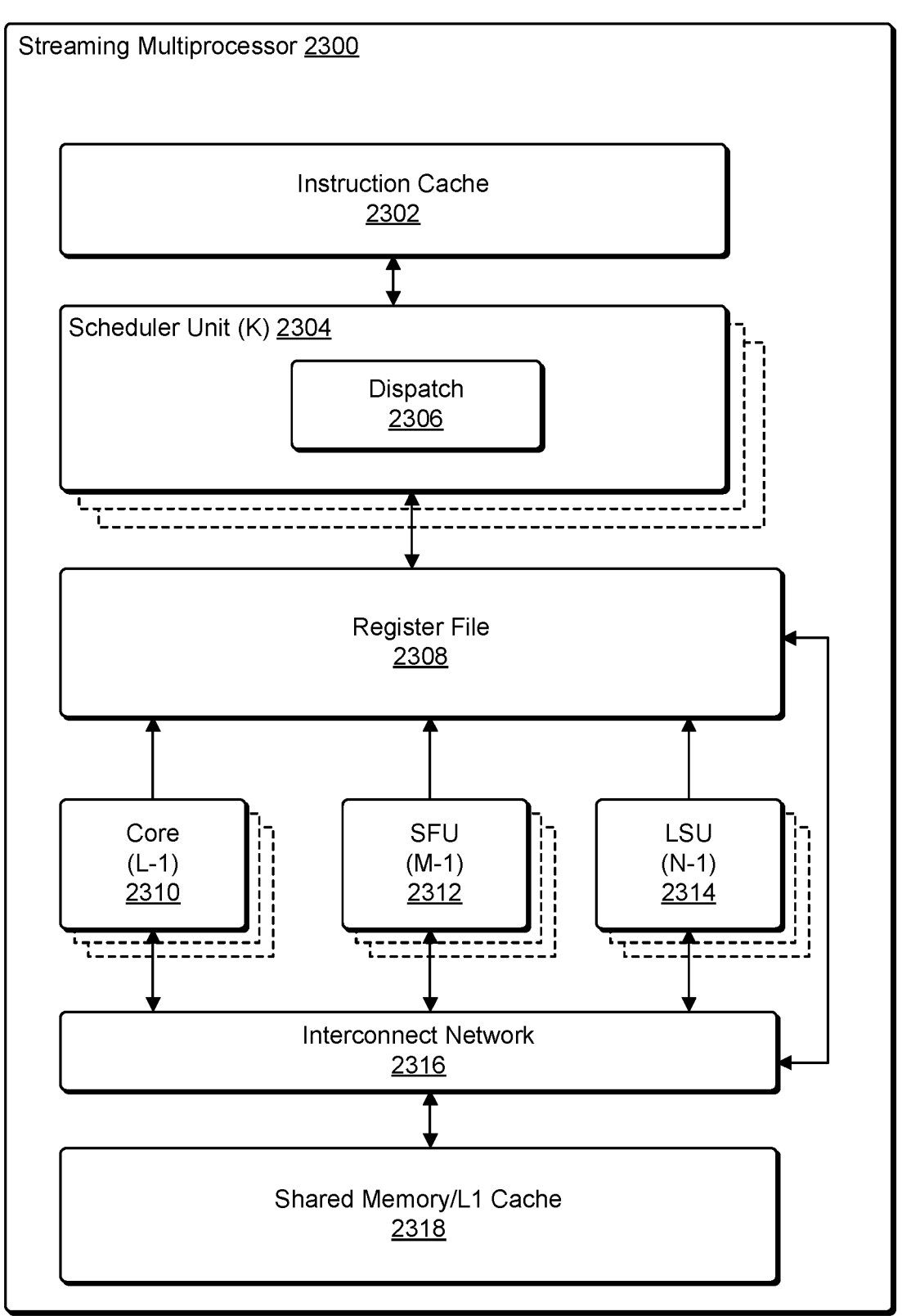
FIG. 23 illustrates a streaming multi-processor, in at least one embodiment.

FIG. 23 illustrates a streaming multi-processor ("SM") 2300, in at least one embodiment. In at least one embodiment, SM 2300 is SM of FIG. 21. In at least one embodiment, SM 2300 includes, without limitation, an instruction cache 2302; one or more scheduler units 2304; a register file 2308; one or more processing cores ("cores") 2310; one or more special function units ("SFUs") 2312; one or more load/store units ("LSUs") 2314; an interconnect network 2316; a shared memory/level one ("L1") cache 2318; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 2300. In at least one embodiment, scheduler unit 2304 receives tasks from work distribution unit and manages instruction scheduling for one or more thread blocks assigned to SM 2300. In at least one embodiment, scheduler unit 2304 schedules thread blocks for execution as warps of parallel threads, wherein each thread block is allocated at least one warp. In at least one embodiment, each warp executes threads. In at least one embodiment, scheduler unit 2304 manages a plurality of different thread blocks, allocating warps to different thread blocks and then dispatching instructions from plurality of different cooperative groups to various functional units (e.g., processing cores 2310, SFUs 2312, and LSUs 2314) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of programming models provide a single, simple construct for synchronizing cooperating threads: a barrier across all threads of a thread block (e.g., a syncthreads( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (such as small as a single thread) and multi-block granularities, and to perform collective operations such as synchronization on threads in a cooperative group. A programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 2306 is configured to transmit instructions to one or more of functional units and scheduler unit 2304 includes, without limitation, two dispatch units 2306 that enable two different instructions from same warp to be dispatched during each clock cycle. In at least one embodiment, each scheduler unit 2304 includes a single dispatch unit 2306 or additional dispatch units 2306.

In at least one embodiment, each SM 2300, in at least one embodiment, includes, without limitation, register file 2308 that provides a set of registers for functional units of SM 2300. In at least one embodiment, register file 2308 is divided between each of functional units such that each functional unit is allocated a dedicated portion of register file 2308. In at least one embodiment, register file 2308 is divided between different warps being executed by SM 2300 and register file 2308 provides temporary storage for operands connected to data paths of functional units. In at least one embodiment, each SM 2300 comprises, without limitation, a plurality of L processing cores 2310. In at least one embodiment, SM 2300 includes, without limitation, a large number (e.g., 128 or more) of distinct processing cores 2310. In at least one embodiment, each processing core 2310, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 2310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 2300 comprises, without limitation, M SFUs 2312 that perform special functions (e.g., attribute evaluation, reciprocal square root, and like). In at least one embodiment, SFUs 2312 include, without limitation, a tree traversal unit configured to traverse a hierarchical tree data structure. In at least one embodiment, SFUs 2312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2300. In at least one embodiment, texture maps are stored in shared memory/L1 cache 2318. In at least one embodiment, texture units implement texture operations such as filtering operations using mip-maps (e.g., texture maps of varying levels of detail), in accordance with at least one embodiment. In at least one embodiment, each SM 2300 includes, without limitation, two texture units.

Each SM 2300 comprises, without limitation, N LSUs 2314 that implement load and store operations between shared memory/L1 cache 2318 and register file 2308, in at least one embodiment. Each SM 2300 includes, without limitation, interconnect network 2316 that connects each of functional units to register file 2308 and LSU 2314 to register file 2308 and shared memory/L1 cache 2318 in at least one embodiment. In at least one embodiment, interconnect network 2316 is a crossbar that can be configured to connect any of functional units to any of registers in register file 2308 and connect LSUs 2314 to register file 2308 and memory locations in shared memory/L1 cache 2318.

In at least one embodiment, shared memory/L1 cache 2318 is an array of on-chip memory that allows for data storage and communication between SM 2300 and primitive engine and between threads in SM 2300, in at least one embodiment. In at least one embodiment, shared memory/L1 cache 2318 comprises, without limitation, 128 KB of storage capacity and is in path from SM 2300 to partition unit. In at least one embodiment, shared memory/L1 cache 2318, in at least one embodiment, is used to cache reads and writes. In at least one embodiment, one or more of shared memory/L1 cache 2318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 2318 enables shared memory/L1 cache 2318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 2300 to execute program and perform calculations, shared memory/L1 cache 2318 to communicate between threads, and LSU 2314 to read and write global memory through shared memory/L1 cache 2318 and memory partition unit. In at least one embodiment, when configured for general purpose parallel computation, SM 2300 writes commands that scheduler unit 2304 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. A graphics card may be configured to interface with a PCIe slot on a motherboard of a desktop computer. In at least one embodiment, PPU may be an integrated graphics processing unit ("iGPU") included in chipset of motherboard.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a central processing unit ("CPU") and bus implementation. In at least one embodiment, various modules may also be situated separately or in various combinations of semiconductor platforms per desires of user.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). The number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors. For example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. A process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   receiving a frame of video data comprising at least an associated hash value appended to the frame of the video data;

decoding the associated hash value of the received frame of video data using a public key;

generating another hash value based on the received frame of video data; and digitally signing the other generated hash value that was generated based on the received frame of video data using a private key responsive to determining that the decoded associated hash value of the received frame of video data matches the other generated hash value that was generated based on the received frame of video data.

2. The method of claim 1, further comprising:

providing a computing device with access to another public key, the computing device is enabled to compare an additional hash value for the frame of video data against the digitally signed hash value in order to verify that the frame of video data is unmodified, wherein the computing device decodes the digitally signed hash value using the other public key to verify that the frame of video data is unmodified.

3. The method of claim 2, wherein the frame of video data comprises a plurality of hash values appended to the frame of video data, at least one of the plurality of hash values associated with another frame of video data associated with the frame of video data.

4. The method of claim 1, further comprising:

receiving the frame of video data from an identified source; and verifying a digital signature of the identified source, wherein a computing device having access to the frame of video data uses the public key to verify the identified source.

5. The method of claim 4, further comprising:

comparing the other hash value against the associated hash value, the associated hash value appended to the frame of video data by a source device that generated the frame of video data, the associated hash value appended to the frame of video data when the source device generates the frame of video data; and determining that the hash value matches the associated hash value before digitally signing the other hash value using the private key.

6. The method of claim 1, further comprising:

causing a computing device, displaying the frame of video data, to display an indication that the frame of video data has been verified as authentic and unmodified.

7. The method of claim 1, further comprising:

digitally signing hash values for a subset of frames of the video data; and periodically adding the signed hash values as blocks to a distributed ledger, the blocks depending in part upon previous blocks added to the distributed ledger for the video data.

8. A system, comprising:

one or more processors; and memory containing instructions that, when executed by the one or more processors, cause the system to:

receive a frame of video data comprising at least an associated hash value appended to the frame of video data;

decode the associated hash value of the received frame of video data using a public key;

generate another hash value based on the received frame of video data; and digitally sign the other generated hash value that was generated based on the received frame of video data using a private key responsive to determining that the decoded associated hash value of the received frame of video data matches the other generated hash value that was generated based on the received frame of video data.

9. The system of claim 8, wherein the instructions when executed further cause the system to:

provide a computing device with access to another public key, the computing device is enabled to compare an additional hash value for the frame of video data against the digitally signed hash value in order to verify that the frame of video data is unmodified, wherein the computing device decodes the digitally signed hash value using the other public key in order to verify that the frame of video data is unmodified.

10. The system of claim 9, wherein the frame of video data comprises a plurality of hash values appended to the frame of video data, at least one of the plurality of hash values associated with another frame of video data associated with the frame of video data.

11. The system of claim 8, wherein the instructions when executed further cause the system to:

receive the video data from an identified source; and verify a digital signature of the identified source, wherein a computing device having access to the frame of video data uses the public key to verify the identified source.

12. The system of claim 11, wherein the instructions when executed further cause the system to:

comparing the other hash value against the associated hash value, the associated hash value appended to the frame of video data by a source device that generated the frame of video data; and determining that the hash value matches original hash value before digitally signing the other hash value using the private key.

13. The system of claim 8, wherein the instructions when executed further cause the system to:

causing a computing device, displaying the frame of video data, to display an indication that the frame of video data has been verified as authentic and unmodified.

14. The system of claim 8, wherein the instructions when executed further cause the system to:

digitally signing hash values for a subset of frames of the video data; and periodically adding the signed hash values as blocks to a distributed ledger, the blocks depending in part upon previous blocks added to the distributed ledger for the video data.

15. A computing device, comprising:

one or more processors; and memory containing instructions that, when executed by the one or more processors, cause the system to:

receive a frame of video data captured using a camera, the frame of video data comprising an associated hash value appended to the frame of video data;

decode the associated hash value of the received frame of video data using a public key;

generate another hash value based on the received frame of video data; and digitally sign the other generated hash value that was generated based on the received frame of video data using a private key responsive to determining that the decoded associated hash value of the received frame of video data matches the other generated hash value that was generated based on the received frame of video data.

16. The computing device of claim 15, wherein the instructions when executed further cause the computing device to:

compare the other hash value for the frame of video data against the associated hash value to determine that the frame of video data is unmodified.

17. The computing device of claim 16, wherein the frame of video data comprises a plurality of hash values appended to the frame of video data, at least one of the plurality of hash values associated with another frame of video data associated with the frame of video data.

18. The computing device of claim 17, wherein the instructions when executed further cause the computing device to:

enable a consumer device, to receive the frame of video data, to verify a source of the frame of video data using a distributed ledger.

19. The computing device of claim 17, wherein the instructions when executed further cause the computing device to:

enable a consumer device, to receive the video data, to verify inclusion of all frames of the video data using signed hash values stored to a distributed ledger.

20. The computing device of claim 15, wherein the private key is encoded in hardware of the computing device.

21. The method of claim 1, further comprising:

analyzing the frame of video data to determine the frame of video data comprises the associated hash value; and based on analyzing the frame of video data, generating the hash value for the frame of video data.

\* \* \* \* \*